(12) United States Patent
Kwak et al.

(10) Patent No.: US 11,906,979 B2
(45) Date of Patent: *Feb. 20, 2024

(54) PLURALITY OF AUTONOMOUS MOBILE ROBOTS AND CONTROLLING METHOD FOR THE SAME

(71) Applicant: LG Electronics Inc., Seoul (KR)

(72) Inventors: Donghoon Kwak, Seoul (KR); Kyoungsuk Ko, Seoul (KR); Sungwook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/586,135

(22) Filed: Jan. 27, 2022

(65) Prior Publication Data

US 2022/0147057 A1 May 12, 2022

Related U.S. Application Data

(63) Continuation of application No. 16/549,724, filed on Aug. 23, 2019, now Pat. No. 11,269,355.

(30) Foreign Application Priority Data

Feb. 19, 2019 (KR) .................. 10-2019-0019430

(51) Int. Cl.
*B25J 9/16* (2006.01)
*G05D 1/00* (2006.01)
*B25J 9/00* (2006.01)

(52) U.S. Cl.
CPC .......... *G05D 1/0287* (2013.01); *B25J 9/0084* (2013.01); *B25J 9/1666* (2013.01)

(58) Field of Classification Search
CPC ...... B25J 9/1666; B25J 9/0084; B25J 9/1602; G05D 1/0287; G05D 1/0027; G05D 1/0291

(Continued)

(56) References Cited

U.S. PATENT DOCUMENTS 4,954,962 A * 9/1990 Evans, Jr. ............ G05D 1/0246
701/28
5,351,056 A * 9/1994 Sawyer ..................... G01S 5/04
342/126

(Continued)

FOREIGN PATENT DOCUMENTS

CN 1399734 A 2/2003
CN 1529838 A 9/2004

(Continued)

OTHER PUBLICATIONS

Notification of Transmittal of the International Search Report and the Written Opinion of the International Searching Authority dated Dec. 17, 2019.

(Continued)

*Primary Examiner* — Dalena Tran
(74) *Attorney, Agent, or Firm* — Birch, Stewart, Kolasch & Birch, LLP

(57) ABSTRACT

A mobile robot includes a communication unit that communicates with another mobile robot, a sensing unit for sensing the other mobile robot existing in a detection area encompassing a predetermined projected angle with respect to the front of a main body of the mobile robot, and a control unit configured for rotating the main body so that the other mobile robot is sensed in the detection area. The communication unit transmits a control signal configured to cause the other mobile robot to travel in a linear direction by a (Continued)

predetermined distance, to the other mobile robot when the other mobile robot is present in the detection area.

15 Claims, 14 Drawing Sheets

Related U.S. Application Data

(60) Provisional application No. 62/727,562, filed on Sep. 6, 2018.

(58) Field of Classification Search
USPC ......... 700/245, 248; 901/6; 318/543, 568.11
See application file for complete search history.

(56) References Cited

U.S. PATENT DOCUMENTS

| | | | |
|---|---|---|---|
| 5,363,305 A * | 11/1994 | Cox | G05D 1/0234 |
| | | | 701/461 |
| 5,569,371 A * | 10/1996 | Perling | E04H 4/1654 |
| | | | 210/167.16 |
| 5,652,489 A | 7/1997 | Kawakami | |
| 5,819,008 A | 10/1998 | Asama et al. | |
| 5,825,981 A | 10/1998 | Matsuda | |
| 6,374,155 B1 | 4/2002 | Wallach | |
| 6,496,755 B2 | 12/2002 | Wallach | |
| 7,054,716 B2 | 5/2006 | McKee | |
| 8,496,078 B2 | 7/2013 | Wellborn | |
| 8,627,908 B2 | 1/2014 | Wellborn | |
| 8,755,936 B2 | 6/2014 | Friedman | |
| 8,918,950 B2 | 12/2014 | Song et al. | |
| 9,308,643 B2 | 4/2016 | Dooley et al. | |
| 9,308,645 B2 | 4/2016 | Dooley | |
| 9,687,131 B2 | 6/2017 | Eidmohammadi et al. | |
| 9,924,699 B2 | 3/2018 | Wisse et al. | |
| 10,602,898 B2 | 3/2020 | Scholten | |
| 2004/0073337 A1 | 4/2004 | McKee | |
| 2004/0204804 A1 | 10/2004 | Lee et al. | |
| 2004/0210344 A1 | 10/2004 | Hara et al. | |
| 2006/0106496 A1 | 5/2006 | Okamoto | |
| 2006/0161341 A1 | 7/2006 | Haegebarth et al. | |
| 2006/0293794 A1 | 12/2006 | Harwig | |
| 2007/0050937 A1 | 3/2007 | Song | |
| 2007/0118248 A1 | 5/2007 | Lee et al. | |
| 2010/0256852 A1 | 10/2010 | Mudalige | |
| 2012/0193153 A1 | 8/2012 | Wellborn | |
| 2013/0060401 A1 | 3/2013 | Hahne | |
| 2014/0124004 A1 | 5/2014 | Rosenstein | |
| 2014/0172223 A1 | 6/2014 | Murphy | |
| 2015/0297052 A1 | 10/2015 | Eidmohammadi et al. | |
| 2016/0188977 A1 | 6/2016 | Kearns et al. | |
| 2017/0113342 A1 | 4/2017 | Abramson | |
| 2017/0332868 A1 | 11/2017 | Nam | |
| 2018/0073266 A1 | 3/2018 | Goldenberg et al. | |
| 2018/0092499 A1 | 4/2018 | Strazisar | |
| 2018/0178391 A1 | 6/2018 | Naito et al. | |
| 2018/0181143 A1 | 6/2018 | Hiramatsu | |
| 2018/0192845 A1 | 7/2018 | Gu | |
| 2018/0250086 A1 | 9/2018 | Grubbs | |
| 2018/0361569 A1 | 12/2018 | Hackert | |
| 2020/0077861 A1 | 3/2020 | Kwak | |
| 2020/0081453 A1 | 3/2020 | Kwak et al. | |
| 2020/0081454 A1 | 3/2020 | Kwak | |
| 2020/0081456 A1 | 3/2020 | Kwak | |

FOREIGN PATENT DOCUMENTS

| | | | |
|---|---|---|---|
| CN | 102048499 A | 5/2011 | |
| CN | 102844722 A | 12/2012 | |
| CN | 103099583 A | 5/2013 | |
| CN | 103522304 | 1/2014 | |
| CN | 103608741 A | 2/2014 | |
| CN | 104997461 | 10/2015 | |
| CN | 105527960 A | 4/2016 | |
| CN | 105686766 | 6/2016 | |
| CN | 205942412 | 2/2017 | |
| CN | 106572776 A | 4/2017 | |
| CN | 106791371 A | 5/2017 | |
| CN | 206473273 | 9/2017 | |
| CN | 107479544 | 12/2017 | |
| CN | 107518830 A | 12/2017 | |
| CN | 107608345 A | 1/2018 | |
| CN | 206850525 | 1/2018 | |
| CN | 107710092 A | 2/2018 | |
| CN | 107792069 A | 3/2018 | |
| CN | 108227697 A | 6/2018 | |
| CN | 108420371 | 8/2018 | |
| JP | 63-150044 A | 6/1988 | |
| JP | 8-63229 A | 3/1996 | |
| JP | 2002-215236 A | 7/2002 | |
| JP | 2003-15739 A | 1/2003 | |
| JP | 2003-269914 A | 9/2003 | |
| JP | 2005192609 | 7/2005 | |
| JP | 2006146491 | 6/2006 | |
| JP | 2007-149088 A | 6/2007 | |
| JP | 2008-191800 A | 8/2008 | |
| JP | 2010015194 A | 1/2010 | |
| JP | 2010-79698 A | 4/2010 | |
| JP | 2010-108433 A | 5/2010 | |
| JP | 2010-238132 A | 10/2010 | |
| JP | 2010235080 | 10/2010 | |
| JP | 4639253 | 12/2010 | |
| JP | 2015-14600 A | 1/2015 | |
| JP | 2015160022 | 9/2015 | |
| JP | 2016-57945 A | 4/2016 | |
| JP | WO2017/030188 A1 | 2/2017 | |
| JP | 2017-129909 A | 7/2017 | |
| JP | 2017-146945 A | 8/2017 | |
| JP | 2017-199190 A | 11/2017 | |
| JP | 2018-120526 A | 8/2018 | |
| KR | 10-2011-0100712 | 9/2011 | |
| KR | 10-1155500 B1 | 6/2012 | |
| KR | 10-2014-0112824 | 9/2014 | |
| KR | 10-2016-0063140 | 6/2016 | |
| KR | 10-2016-0070467 | 6/2016 | |
| KR | 10-2016-0133348 | 11/2016 | |
| KR | 10-2017-0090631 | 8/2017 | |
| KR | 10-2018-0031153 A | 3/2018 | |
| KR | 10-2018-0046175 A | 5/2018 | |
| KR | 10-2018-0048705 | 5/2018 | |
| TW | 201722336 | 1/2017 | |
| TW | 1654961 B | 4/2019 | |
| WO | WO 2014/207299 A1 | 12/2014 | |
| WO | WO2017/036532 | 3/2017 | |

OTHER PUBLICATIONS

Taiwan Office Action dated Jun. 2, 2020, on Taiwanese Application No. 108131938.
Korean Office Action, dated Sep. 11, 2020, issued in Korean Patent Application No. 10-2019-0020081 (6 pages).
Taiwanese Office Action dated May 28, 2021, on Taiwanese Application No. 108128347.
Taiwanese Office Action dated Jul. 7, 2021, on Taiwanese Application No. 108131942.
Office Action in U.S. Appl. No. 16/562,678, dated Oct. 28, 2021.
Examination Report No. 1 for Australian Application No. 2019334724 dated Oct. 27, 2021.

* cited by examiner

PLURALITY OF AUTONOMOUS MOBILE ROBOTS AND CONTROLLING METHOD FOR THE SAME

CROSS-REFERENCE TO RELATED APPLICATION

This application is a continuation application of U.S. patent application Ser. No. 16/549,724, filed on Aug. 23, 2019, which claims the benefit under 35 U.S.C. § 119(a) of an earlier filing date of and the right of priority to Korean Application No. 10-2019-0019430, filed on Feb. 19, 2019, and U.S. Provisional Application No. 62/727,562, filed on Sep. 6, 2018, the contents of all of which are incorporated by reference herein in their entireties.

BACKGROUND OF THE DISCLOSURE

1. Field of the Disclosure

The present disclosure relates to a plurality of autonomous mobile robots.

2. Description of the Related Art

Generally, a mobile robot is a device that automatically performs a predetermined operation while traveling by itself in a predetermined area without a user's operation. The mobile robot senses obstacles located in the area and performs its operations by moving close to or away from such obstacles.

Such mobile robot may include a robot cleaner that performs cleaning while traveling in an area.

The robot cleaner is a cleaner that performs cleaning while traveling by itself without user's operation.

In this manner, with the development of such mobile robots performing cleaning while traveling by themselves without users' operations, necessity to make a plurality of mobile robots perform cleaning in a collaborating manner without users' operations is emerging as an interest.

The prior art document WO2017-036532 discloses a method in which a master robot cleaner (hereinafter, referred to as a master robot) controls at least one slave robot cleaner (hereinafter, referred to as a slave robot).

The prior art document discloses a configuration in which the master robot detects adjacent obstacles by using an obstacle detection device and determines its position related to the slave robot using position data derived from the obstacle detection device.

In addition, the prior art discloses a configuration in which the master robot and the slave robot perform communication with each other via a server using wireless local area network (WLAN) technology.

According to the prior art document, the master robot can determine the position of the slave robot but the slave robot cannot determine the position of the master robot.

Further, in order for the slave robot to determine (decide) the position of the master robot using the configuration disclosed in the prior art document, the master robot must transmit relative position information regarding the slave robot determined by the master robot to the slave robot through the server.

However, the prior art fails to disclose such a configuration in which the master robot transmits relative position information to the slave robot via the server.

In addition, even if it is assumed that the master robot transmits relative position information, the master robot and the slave robot should perform communication only through the server. Accordingly, such communication with the server may be disconnected when the master robot or the slave robot is located at a place where it is difficult to communicate with a server.

In this case, since the slave robot does not receive the relative position information from the server, the slave robot has difficulty in determining the relative position of the master robot, which causes a problem that seamless follow-up control of the master robot and the slave robot is not performed.

In order to perform seamless follow-up control through communication between a plurality of autonomous mobile robots, it is necessary to determine whether the master robot is located at the front or at the rear of the slave robot, or whether the slave robot is located at the front or at the rear of the master robot.

However, the prior art document does not determine whether the master robot is located at the front or at the rear of the slave robot, or whether the slave robot is located at the front or at the rear of the master robot.

SUMMARY OF THE DISCLOSURE

One aspect of the present disclosure is to provide mobile robots, capable of performing cleaning in an optimized manner without user's intervention, and a control method thereof.

Another aspect of the present disclosure is to provide mobile robots wherein one of a plurality of mobile robots follows up another one in an optimized manner, and a control method thereof.

Still another aspect of the present disclosure is to provide mobile robots, capable of recognizing relative positions of a plurality of mobile robots, irrespective of a communication state between the plurality of mobile robots and a server, and a control method thereof.

Still another aspect of the present disclosure is to provide mobile robots each of which is configured to recognize a direction that another robot is located with respect to the front so as to perform seamless follow-up control, and a control method thereof.

Still another aspect of the present disclosure is to provide mobile robots wherein a second mobile robot following a first mobile robot can follow the first mobile robot without failure, and a control method thereof.

Still another aspect of the present disclosure is to provide mobile robots wherein a second mobile robot can determine a direction that a first mobile robot faces, in an optimized manner, so as to travel while following the first mobile robot, and a control method thereof.

Still another aspect of the present disclosure is to provide mobile robots, capable of providing an optimized start scenario when a plurality of mobile robots starts a following travel, and a control method thereof.

Still another aspect of the present disclosure is to provide mobile robots wherein a plurality of mobile robots can be arranged to enable an optimized following travel, and a control method thereof.

To achieve these aspects and other advantages of the present disclosure, there is provided a mobile robot, including a traveling unit to move or rotate a main body, a communication unit to perform communication with another mobile robot, a sensing unit to sense the other mobile robot existing in a detection area encompassing a predetermined projected angle with respect to the front of the main body, and a control unit to rotate the main body so that the other mobile robot is sensed within the detection area, and control the communication unit to transmit a control signal, for causing linear travel of the other mobile robot by a predetermined distance, to the other mobile robot when the other mobile robot is present in the detection area due to the rotation of the main body.

In an embodiment disclosed herein, the control unit may determine through the sensing unit a direction in which the other mobile robot linearly travels, and decide the determined direction as a direction that the other mobile robot faces.

In an embodiment disclosed herein, the control unit may decide a relative position of the other mobile robot through the sensing unit, determine a plurality of relative positions of the other mobile robot during the linear travel of the other mobile robot, and decide a direction that the other mobile robot faces based on the plurality of relative positions of the other mobile robot.

In an embodiment disclosed herein, the control unit may decide coordinates of a position of the other mobile robot and an angle of a direction that the other mobile robot faces, based on a relative position of the other mobile robot and the direction that the other mobile robot faces both decided through the sensing unit.

In an embodiment disclosed herein, the control unit may rotate the main body based on a decision of a relative position of the other mobile robot through the sensing unit.

In an embodiment disclosed herein, the control unit may decide a relative position of the other mobile robot through the sensing unit, based on presence of the other mobile robot within the detection area due to the rotation of the main body.

In an embodiment disclosed herein, the control unit may transmit the control signal to the other mobile robot after the decision of the relative position of the other mobile robot.

In an embodiment disclosed herein, the control unit may transmit and receive an ultra-wideband (UWB) signal to and from the other mobile robot through the sensing unit, determine a distance up to the other mobile robot using the UWB signal, and determine a relative position of the other mobile robot, based on an angle by which the main body is rotated so that the other mobile robot is present within the detection area, and the decided distance.

In an embodiment disclosed herein, the control unit may rotate the main body such that a front surface of the main body faces one point of the other mobile robot.

In an embodiment disclosed herein, the control unit may rotate the main body so that the other mobile robot is located back in the detection area when the other mobile robot is moved away from the detection area due to the linear travel of the other mobile robot.

In an embodiment disclosed herein, the control unit may determine through the sensing unit a direction that the other mobile robot is moved away from the detection area, and rotate the main body in a direction corresponding to the determined direction.

In an embodiment disclosed herein, the control unit may determine a relative position of the other mobile robot and a direction that the other mobile robot faces, based on the linear travel of the other mobile robot by the predetermined distance, and transmit to the other mobile robot a control signal for moving the other mobile robot to a specific point within the detection area, based on the relative position of the other mobile robot and the direction that the other mobile robot faces.

In an embodiment disclosed herein, the control unit may transmit to the other mobile robot a control signal for rotating the other mobile robot to face a direction that is the same as the front of the main body when the other mobile robot is sensed as being located at the specific point.

In an embodiment disclosed herein, the control unit may decide a relative position of the other mobile robot and a direction that the other mobile robot faces, based on the linear travel of the other mobile robot by the predetermined distance, and move the main body to a point which is located at the rear of the other mobile robot with a predetermined spaced distance from the other mobile robot.

In an embodiment disclosed herein, the control unit may rotate the main body to face the same direction as the direction that the other mobile robot faces after being moved to the point that is located at the rear of the other mobile robot with the predetermined spaced distance from the other mobile robot.

To achieve these aspects and other advantages of the present disclosure, there is provided a method for controlling a mobile robot, the method including rotating a main body such that another mobile robot is sensed within a detection area encompassing a predetermined projected angle with respect to the front of the main body, transmitting to the other mobile robot a control signal for causing linear travel of the other mobile robot by a predetermined distance when the other mobile robot is located within the detection area due to the rotation of the main body, and determining a direction that the other mobile robot linearly travels and to decide the determined direction as a direction that the other mobile robot faces The present disclosure can provide a plurality of autonomous mobile robots capable of accurately determining a relative position of another mobile robot and a direction that the other mobile robot faces.

The present disclosure can provide mobile robots capable of smoothly performing a following travel in a manner that another mobile robot follows a mobile robot without failure even if the other mobile robot moves out of a detection area of the mobile robot.

The present disclosure can provide a new following control method, capable of preventing a mobile robot from missing another mobile robot by rotating the mobile robot to detect the other mobile robot in a detection area of the mobile robot again when the other mobile robot moves out of the detection area, and allowing the mobile robot to follow the other mobile robot even if the other mobile robot moves out of the detection area of the mobile robot.

The present disclosure can provide mobile robots, capable of determining even a direction that another mobile robot faces as well as a relative position of the other mobile robot when the mobile robot desires to start a following travel to travel while following the other mobile robot.

The present disclosure can provide mobile robots, capable of starting a following travel after determining an accurate state of another mobile robot which a mobile robot desires to follow, by way of determining a relative position of the other mobile robot and a direction that the other mobile robot faces.

The present disclosure can provide mobile robots, capable of performing an optimized following travel, by aligning the mobile robot and another mobile robot at positions and in states (facing direction) optimized for the mobile robot to follow the other mobile robot and then starting the following travel after the alignment.

DETAILED DESCRIPTION OF THE DISCLOSURE

Hereinafter, autonomous mobile robots according to the present disclosure will be described in detail with reference to the accompanying drawings.

Hereinafter, description will be given in detail of embodiments disclosed herein. Technical terms used in this specification are merely used for explaining specific embodiments, and should not be construed to limit the scope of the technology disclosed herein.

First, the term "mobile robot" disclosed herein may be used as the same meaning as 'robot (for a specific function),' 'robot cleaner,' 'robot for cleaning' and 'autonomous cleaner,' and those terms will be used equally.

A "plurality of mobile robots" disclosed in the present disclosure may be used as a "plurality of robot cleaners" or "a plurality of cleaners". Also, a "first mobile robot" may be named "first robot", "first robot cleaner", "first cleaner", or "leading or master cleaner". Further, a "second mobile robot" may be named as "second robot", "second robot cleaner", "second cleaner", or "following or slave cleaner".

Figure 1:
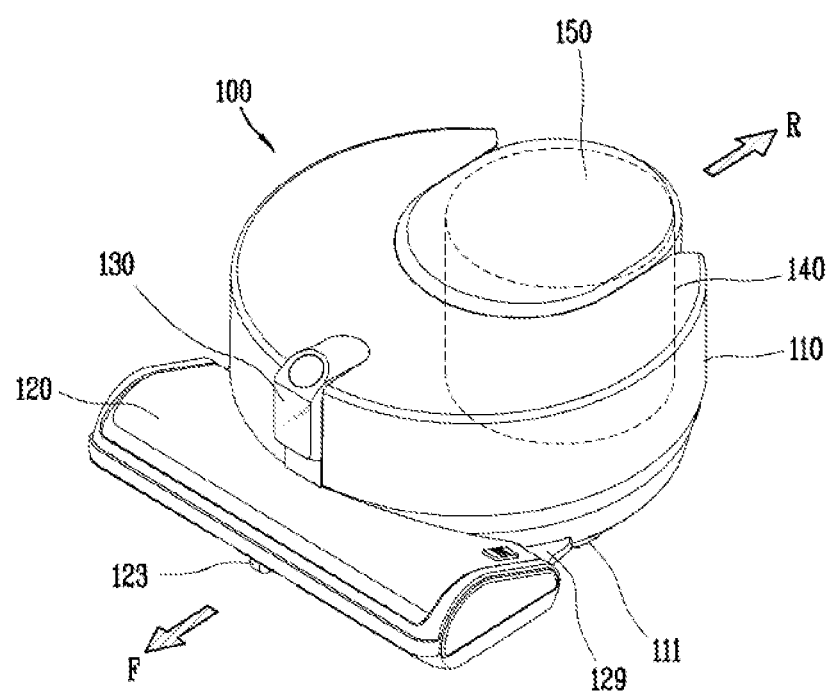
FIG. 1 is a perspective view illustrating one embodiment of a robot cleaner according to the present disclosure.
Figure 2:
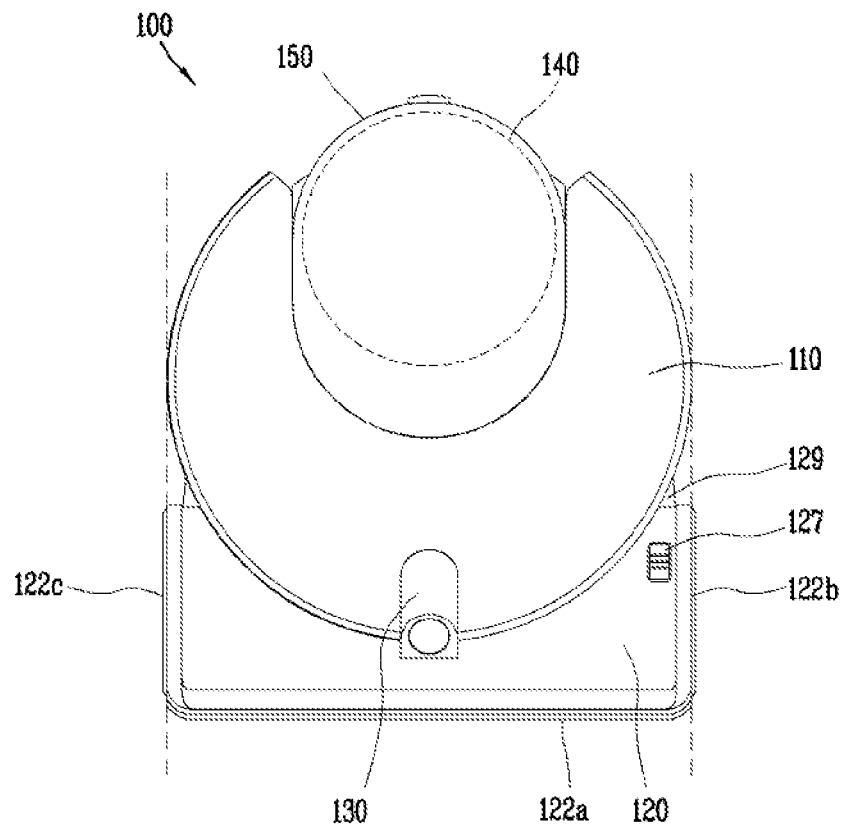
FIG. 2 is a planar view of the autonomous mobile robot illustrated in FIG. 1.
Figure 3:
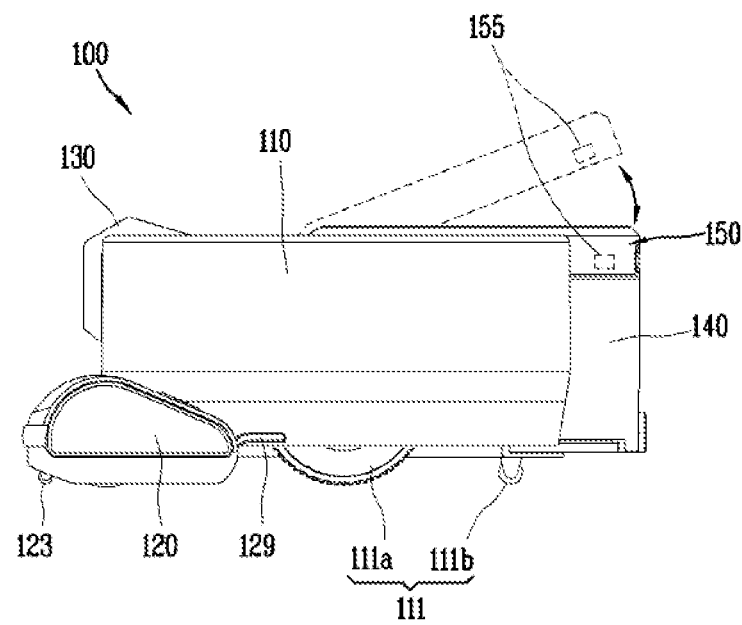
FIG. 3 is a lateral view of the autonomous mobile robot illustrated in FIG. 1.

FIGS. 1 to 3 illustrate a robot cleaner as an example of a mobile robot according to the present disclosure.

FIG. 1 is a perspective view illustrating one embodiment of an autonomous mobile robot 100 according to the present disclosure, FIG. 2 is a planar view of the autonomous mobile robot 100 illustrated in FIG. 1, and FIG. 3 is a lateral view of the autonomous mobile robot 100 illustrated in FIG. 1.

In this specification, a mobile robot, an autonomous mobile robot, and a cleaner that performs autonomous traveling may be used in the same sense. In this specification, a plurality of autonomous mobile robots may include at least part of configurations illustrated in FIGS. 1 to 3.

Referring to FIGS. 1 to 3, an autonomous mobile robot 100 performs a function of cleaning a floor while traveling on a predetermined area by itself. Cleaning the floor disclosed herein includes sucking dust (including foreign materials) on the floor or mopping the floor.

The autonomous mobile robot 100 may include a cleaner main body 110, a cleaning unit 120, a sensing unit 130, and a dust bin 140.

The cleaner main body 110 is provided with various components in addition to a controller (not illustrated) for controlling the mobile robot 100. In addition, the cleaner main body 110 is provided with a wheel unit 111 for traveling the autonomous mobile robot 100. The autonomous mobile robot 100 may be moved or rotated forward, backward, left or right by the wheel unit 111.

Referring to FIG. 3, the wheel unit 111 includes main wheels 111a and a sub wheel 111b.

The main wheels 111a are provided on both sides of the cleaner main body 110 and configured to be rotatable in one direction or another direction according to a control signal of the control unit. Each of the main wheels 111a may be configured to be driven independently of each other. For example, each main wheel 111a may be driven by a different motor. Or each main wheel 111a may be driven by a plurality of different axes provided in one motor.

The sub wheel 111b supports the cleaner main body 110 together with the main wheels 111a and assists the traveling of the autonomous mobile robot 100 by the main wheels 111a. The sub wheel 111b may also be provided on a cleaning unit 120 to be described later.

The control unit controls the driving of the wheel unit 111, so that the autonomous mobile robot 100 is allowed to autonomously run the floor.

Meanwhile, the cleaner main body 110 is provided with a battery (not shown) for supplying power to the autonomous mobile robot 100. The battery 190 may be configured to be rechargeable, and may be detachably disposed in a bottom portion of the cleaner main body 110.

In FIG. 1, a cleaning unit 120 may be disposed in a protruding form from one side of the cleaner main body 110, so as to suck air containing dust or mop an area. The one side may be a side where the cleaner main body 110 travels in a forward direction F, that is, a front side of the cleaner main body 110.

In this drawing, the cleaning unit 120 is shown having a shape protruding from one side of the cleaner main body 110 to front and both left and right sides. Specifically, a front end portion of the cleaning unit 120 is disposed at a position spaced forward apart from the one side of the cleaner main body 110, and left and right end portions of the cleaning unit 120 are disposed at positions spaced apart from the one side of the cleaner main body 110 in the right and left directions.

As the cleaner main body 110 is formed in a circular shape and both sides of a rear end portion of the cleaning unit 120 protrude from the cleaner main body 110 to both left and right sides, empty spaces, namely, gaps may be formed between the cleaner main body 110 and the cleaning unit 120. The empty spaces are spaces between both left and right end portions of the cleaner main body 110 and both left and right end portions of the cleaning unit 120 and each has a shape recessed into the autonomous mobile robot 100.

If an obstacle is caught in the empty space, the autonomous mobile robot 100 may be likely to be unmovable due to the obstacle. To prevent this, a cover member 129 may be disposed to cover at least part of the empty space.

The cover member 129 may be provided on the cleaner main body 110 or the cleaning unit 120. In an embodiment of the present disclosure, the cover member 129 protrude from each of both sides of the rear end portion of the cleaning unit 120 and covers an outer circumferential surface of the cleaner main body 110.

The cover member 129 is disposed to fill at least part of the empty space, that is, the empty space between the cleaner main body 110 and the cleaning unit 120. This may result in realizing a structure capable of preventing an obstacle from being caught in the empty space, or to easily escape an obstacle even if the obstacle is caught in the empty space.

The cover member 129 protruding from the cleaning unit 120 may be supported on the outer circumferential surface of the cleaner main body 110.

The cover member 129 may be supported on a rear portion of the cleaning unit 120 if the cover member 129 protrudes from the cleaner main body 110. According to this structure, when the cleaning unit 120 is impacted due to colliding with an obstacle, a part of the impact is transferred to the cleaner main body 110 so as to be dispersed.

The cleaning unit 120 may be detachably coupled to the cleaner main body 110. When the cleaning unit 120 is detached from the cleaner main body 110, a mop module (not shown) may be detachably coupled to the cleaner main body 110 in place of the detached cleaning unit 120.

Accordingly, the user can mount the cleaning unit 120 on the cleaner main body 110 when the user wishes to remove dust on the floor, and may mount the mop module on the cleaner main body 110 when the user wants to mop the floor.

When the cleaning unit 120 is mounted on the cleaner main body 110, the mounting may be guided by the cover member 129 described above. That is, as the cover member 129 is disposed to cover the outer circumferential surface of the cleaner main body 110, a relative position of the cleaning unit 120 with respect to the cleaner main body 110 may be determined.

The cleaning unit 120 may be provided with a castor 123. The caster 123 assists the running of the autonomous mobile robot 100 and also supports the autonomous mobile robot 100.

The cleaner main body 110 is provided with a sensing unit 130. As illustrated, the sensing unit 130 may be disposed on one side of the cleaner main body 110 where the cleaning unit 120 is located, that is, on a front side of the cleaner main body 110.

The sensing unit 130 may be disposed to overlap the cleaning unit 120 in an up and down direction of the cleaner main body 110. The sensing unit 130 is disposed at an upper portion of the cleaning unit 120 so as to detect an obstacle or feature in front of the robot so that the cleaning unit 120 positioned at the forefront of the autonomous mobile robot 100 does not hit the obstacle.

The sensing unit 130 may be configured to additionally perform another sensing function other than the sensing function.

By way of example, the sensing unit 130 may include a camera 131 for acquiring surrounding images. The camera 131 may include a lens and an image sensor. The camera 131 may convert a surrounding image of the cleaner main body 110 into an electrical signal that can be processed by the control unit. For example, the camera 131 may transmit an electrical signal corresponding to an upward image to the control unit. The electrical signal corresponding to the upward image may be used by the control unit to detect the position of the cleaner main body 110.

In addition, the sensing unit 130 may detect obstacles such as walls, furniture, and cliffs on a traveling surface or a traveling path of the autonomous mobile robot 100. Also, the sensing unit 130 may sense presence of a docking device that performs battery charging. Also, the sensing unit 130 may detect ceiling information so as to map a traveling area or a cleaning area of the autonomous mobile robot 100.

The cleaner main body 110 is provided with a dust container 140 detachably coupled thereto for separating and collecting dust from sucked air.

The dust container 140 is provided with a dust container cover 150 which covers the dust container 140. In an embodiment, the dust container cover 150 may be coupled to the cleaner main body 110 by a hinge to be rotatable. The dust container cover 150 may be fixed to the dust container 140 or the cleaner main body 110 to keep covering an upper surface of the dust container 140. The dust container 140 may be prevented from being separated from the cleaner main body 110 by the dust container cover 150 when the dust container cover 150 is disposed to cover the upper surface of the dust container 140.

A part of the dust container 140 may be accommodated in a dust container accommodating portion and another part of the dust container 140 protrudes toward the rear of the cleaner main body 110 (i.e., a reverse direction R opposite to a forward direction F).

The dust container 140 is provided with an inlet through which air containing dust is introduced and an outlet through which air separated from dust is discharged. The inlet and the outlet communicate with each other through an opening 155 formed through an inner wall of the cleaner main body 110 when the dust container 140 is mounted on the cleaner main body 110. Thus, an intake passage and an exhaust passage inside the cleaner main body 110 may be formed.

According to such connection, air containing dust introduced through the cleaning unit 120 flows into the dust container 140 through the intake passage inside the cleaner main body 110 and the air is separated from the dust while passing through a filter and cyclone of the dust container 140. The separated dust is collected in the dust container 140, and the air is discharged from the dust container 140 and flows along the exhaust passage inside the cleaner main body 110 so as to be externally exhausted through an exhaust port.

Hereinafter, an embodiment related to the components of the autonomous mobile robot 100 will be described with reference to FIG. 4.

An autonomous mobile robot 100 or a mobile robot according to an embodiment of the present disclosure may include a communication unit 1100, an input unit 1200, a traveling unit 1300, a sensing unit 1400, an output unit 1500, a power supply unit 1600, a memory 1700, a control unit 1800, and a cleaning unit 1900, or a combination thereof.

Figure 4:
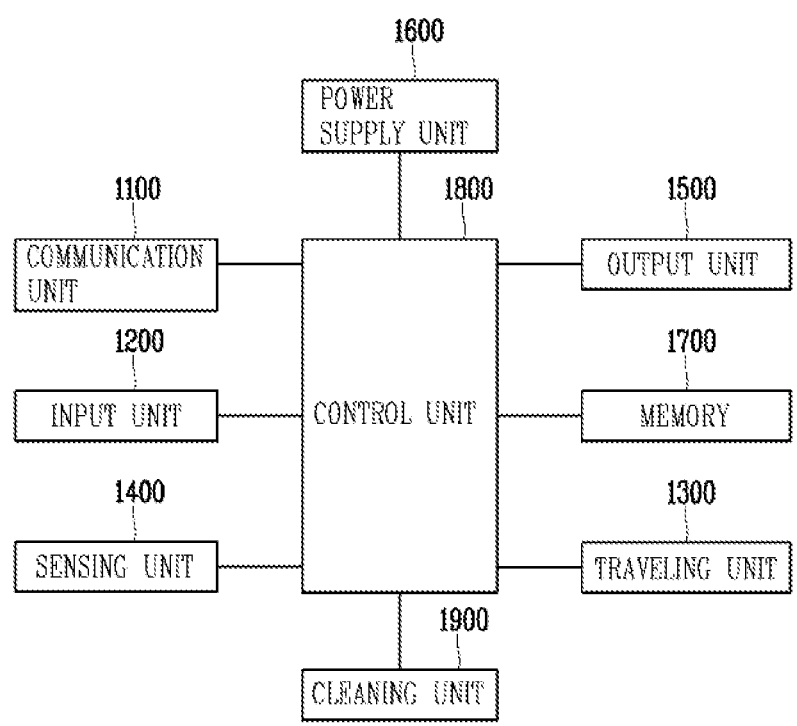
FIG. 4 is a block diagram illustrating exemplary components of an autonomous mobile robot according to one embodiment of the present disclosure.

At this time, those components shown in FIG. 4 are not essential, and an autonomous mobile robot having greater or fewer components can be implemented. Also, as described above, each of a plurality of autonomous mobile robots described in the present disclosure may equally include only some of components to be described below. That is, a plurality of autonomous mobile robots may include different components.

Hereinafter, each component will be described.

First, the power supply unit 1600 includes a battery that can be charged by an external commercial power supply, and supplies power to the mobile robot. The power supply unit 1600 supplies driving force to each of the components included in the mobile robot to supply operating power required for the mobile robot to travel or perform a specific function.

At this time, the control unit 1800 may detect a remaining amount of power (or remaining power level or battery level) of the battery. The control unit 1800 may control the mobile robot to move to a charging base connected to the external commercial power supply when the remaining power is insufficient, so that the battery can be charged by receiving charging current from the charging base. The battery may be connected to a battery sensing portion so that a remaining power level and a charging state can be transmitted to the control unit 1800. The output unit 1500 may display the remaining battery level under the control of the control unit.

The battery may be located in a bottom portion of a center of the autonomous mobile robot, or may be located in either the left or right side. In the latter case, the mobile robot may further include a balance weight to eliminate weight bias of the battery.

The control unit 1800 performs processing of information based on an artificial intelligence (AI) technology and may include one or more modules that perform at least one of learning of information, inference of information, perception of information, and processing of natural language.

The control unit 1800 may use a machine running technology to perform at least one of learning, inferring and processing a large amount of information (big data), such as information stored in the cleaner, environmental information around a mobile terminal, information stored in an external storage capable of performing communication, and the like. The control unit 1800 may control the cleaner to predict (or infer) at least one executable operation and execute an operation having the highest feasibility among the predicted at least one operation, by using the information learned using the machine running technology.

Machine learning technology is a technology that collects and learns a large amount of information based on at least one algorithm, and judges and predicts information based on the learned information. The learning of information is an operation that grasps characteristics, rules, and judgment criteria of information, quantifies relationship between information and information, and predicts new data using a quantified pattern.

The at least one algorithm used by the machine learning technology may be a statistical based algorithm, for example, a decision tree that uses a tree structure type as a prediction model, an artificial neural network copying neural network architecture and functions, genetic programming based on biological evolutionary algorithms, clustering to distribute observed examples into subsets of clusters, Monte Carlo method to compute function values through randomly extracted random numbers from probability, or the like.

As a field of machine learning technology, deep learning is a technique that performs at least one of learning, judging, and processing of information using an Artificial Neural Network (ANN) or a Deep Neuron Network (DNN) algorithm. Such DNN may have an architecture in which layers are connected to transfer data between layers. This deep learning technology may allow learning of a large amount of information through the DNN using a graphic processing unit (GPU) optimized for parallel computing.

The control unit 1800 may use training data stored in an external server or memory, and may include a learning engine mounted to detect characteristics for recognizing a predetermined object. At this time, the characteristics for recognizing the object may include a size, shape and shade of the object.

Specifically, when the control unit 1800 inputs a part of images acquired through the camera provided on the cleaner into the learning engine, the learning engine may recognize at least one object or organism included in the input images.

When the learning engine is applied to traveling of the cleaner, the control unit 1800 can recognize whether or not an obstacle such as a chair leg, a fan, and a specific shape of balcony gap, which obstruct the running of the cleaner, exists around the cleaner. This may result in enhancing efficiency and reliability of the traveling of the cleaner.

On the other hand, the learning engine may be mounted on the control unit 1800 or on an external server. When the learning engine is mounted on an external server, the control unit 1800 may control the communication unit 1100 to transmit at least one image to be analyzed, to the external server.

The external server may input the image transmitted from the cleaner into the learning engine and thus recognize at least one object or organism included in the image. In addition, the external server may transmit information related to the recognition result back to the cleaner. In this case, the information related to the recognition result may include information related to the number of objects included in the image to be analyzed and a name of each object.

On the other hand, the traveling unit 1300 may include a motor, and operate the motor to bidirectionally rotate left and right main wheels, so that the main body can rotate or move. At this time, the left and right main wheels may be independently moved. The traveling unit 1300 may advance the main body of the mobile robot forward, backward, left, right, curvedly, or in place.

On the other hand, the input unit 1200 receives various control commands for the autonomous mobile robot from the user. The input unit 1200 may include one or more buttons, for example, the input unit 1200 may include an OK button, a setting button, and the like. The OK button is a button for receiving a command for confirming detection information, obstacle information, position information, and map information from the user, and the setting button is a button for receiving a command for setting those types of information from the user.

In addition, the input unit 1200 may include an input reset button for canceling a previous user input and receiving a new user input, a delete button for deleting a preset user input, a button for setting or changing an operation mode, a button for receiving an input to return to the charging base.

In addition, the input unit 1200 may be implemented as a hard key, a soft key, a touch pad, or the like and may be disposed on a top of the mobile robot. For example, the input unit 1200 may implement a form of a touch screen together with the output unit 1500.

On the other hand, the output unit 1500 may be installed on a top of the mobile robot. Of course, an installation location and an installation type may vary. For example, the output unit 1500 may display a battery level state, a traveling mode or manner, or the like on a screen.

The output unit 1500 may output internal status information of the mobile robot detected by the sensing unit 1400, for example, a current status of each component included in the mobile robot. The output unit 1500 may also display external status information detected by the sensing unit 1400, obstacle information, position information, map information, and the like on the screen. The output unit 1500 may be configured as one device of a light emitting diode (LED), a liquid crystal display (LCD), a plasma display panel, and an organic light emitting diode (OLED).

The output unit 1500 may further include an audio output module for audibly outputting information related to an operation of the mobile robot executed by the control unit 1800 or an operation result. For example, the output unit 1500 may output warning sound to the outside in response to a warning signal generated by the control unit 1800.

In this case, the audio output module (not shown) may be means, such as a beeper, a speaker or the like for outputting sounds, and the output unit 1500 may output sounds to the outside through the audio output module using audio data or message data having a predetermined pattern stored in the memory 1700.

Accordingly, the mobile robot according to an embodiment of the present disclosure can output environmental information related to a traveling area through the output unit 1500 or output the same in an audible manner. According to another embodiment, the mobile robot may transmit map information or environmental information to a terminal device through the communication unit 1100 so that the terminal device outputs a screen to be output through the output unit 1500 or sounds.

The memory 1700 stores a control program for controlling or driving the autonomous mobile robot and data corresponding thereto. The memory 1700 may store audio information, image information, obstacle information, position information, map information, and the like. Also, the memory 1700 may store information related to a traveling pattern.

The memory 1700 mainly uses a nonvolatile memory. Here, the non-volatile memory (NVM, NVRAM) is a storage device that can continuously store information even when power is not supplied. Examples of the storage device include a ROM, a flash memory, a magnetic computer storage device (e.g., a hard disk, a diskette drive, a magnetic tape), an optical disk drive, a magnetic RAM, a PRAM, and the like.

On the other hand, the sensing unit 1400 may include at least one of an external signal sensor, a front sensor, a cliff sensor, a two-dimensional (2D) camera sensor, and a three-dimensional (3D) camera sensor.

The external signal sensor or external signal detection sensor may sense an external signal of a mobile robot. The external signal sensor may be, for example, an infrared ray (IR) sensor, an ultrasonic sensor, a radio frequency (RF) sensor, or the like.

The mobile robot may detect a position and direction of the charging base by receiving a guidance signal generated by the charging base using the external signal sensor. At this time, the charging base may transmit a guidance signal indicating a direction and distance so that the mobile robot can return thereto. That is, the mobile robot may determine a current position and set a moving direction by receiving a signal transmitted from the charging base, thereby returning to the charging base.

On the other hand, the front sensors or front detection sensors may be installed at a predetermined distance on the front of the mobile robot, specifically, along a circumferential surface of a side surface of the mobile robot. The front sensor is located on at least one side surface of the mobile robot to detect an obstacle in front of the mobile robot. The front sensor may detect an object, especially an obstacle, existing in a moving direction of the mobile robot and transmit detection information to the control unit 1800. That is, the front sensor may detect protrusions on the moving path of the mobile robot, household appliances, furniture, walls, wall corners, and the like, and transmit the information to the control unit 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

An ultrasonic sensor, for example, may generally be used to detect a remote obstacle. The ultrasonic sensor may be provided with a transmitter and a receiver. The control unit 1800 may determine presence or non-presence of an obstacle according to whether ultrasonic waves radiated from the transmitter are reflected by an obstacle or the like and then received by the receiver, and calculate a distance from the obstacle using an ultrasonic wave radiation time and a ultrasonic wave reception time.

Also, the control unit 1800 may detect information related to a size of an obstacle by comparing ultrasonic waves radiated from the transmitter with ultrasonic waves received by the receiver. For example, the control unit 1800 may determine that the obstacle is larger in size when more ultrasonic waves are received in the receiver.

In one embodiment, a plurality (e.g., five) of ultrasonic sensors may be installed on side surfaces of the mobile robot at the front side along an outer circumferential surface. At this time, the ultrasonic sensors may preferably be installed on the front surface of the mobile robot in a manner that the transmitter and the receiver are alternately arranged.

That is, the transmitters may be disposed at right and left sides with being spaced apart from a front center of the main body or one transmitter or at least two transmitters may be disposed between the receivers so as to form a reception area of an ultrasonic signal reflected from an obstacle or the like. With this arrangement, the reception area can increase while reducing the number of sensors. A radiation angle of ultrasonic waves may be maintained in a range of avoiding an affection to different signals so as to prevent a crosstalk. Also, receiving sensitivity of the receivers may be set differently.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front sensor may include an IR sensor as another sensor, in addition to the ultrasonic sensor.

The IR sensor may be installed on an outer circumferential surface of the mobile robot together with the ultrasonic sensor. The IR sensor may also detect an obstacle existing on a front or side of the mobile robot and transmit obstacle information to the control unit 1800. That is, the IR sensor senses a protrusion, a household fixture, furniture, a wall, a wall edge, and the like, existing on the moving path of the mobile robot, and transmits detection information to the control unit 1800. Therefore, the mobile robot can move within a specific area without collision with an obstacle.

On the other hand, a cliff sensor (or cliff detection sensor) may detect an obstacle on the floor supporting the main body of the mobile robot by mainly using various types of optical sensors.

That is, the cliff sensor may also be installed on a rear surface of the mobile robot on the floor, but may be installed on a different position depending on a type of the mobile robot. The cliff sensor is located on the rear surface of the mobile robot and detects an obstacle on the floor. The cliff sensor may be an IR sensor, an ultrasonic sensor, an RF sensor, a Position Sensitive Detector (PSD) sensor, and the like, which include a transmitter and a receiver, similar to the obstacle detection sensor.

For example, one of the cliff sensors may be installed on the front of the mobile robot, and two other cliff sensors may be installed relatively behind.

For example, the cliff sensor may be a PSD sensor, but may alternatively be configured by a plurality of different kinds of sensors.

The PSD sensor detects a short/long distance location of incident light at one p-n junction using semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. As a type of infrared sensor, the PSD sensor uses infrared rays. The PSD sensor emits infrared ray, and measures a distance by calculating an angle of the infrared ray reflected and returned from an obstacle. That is, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The control unit 1800 may measure an infrared ray angle between a light signal of infrared ray emitted by the cliff detection sensor toward the ground and a reflection signal reflected and received from an obstacle, so as to detect a cliff and analyze a depth of the cliff.

Meanwhile, the control unit 1800 may determine whether to pass a cliff or not according to a ground state of the detected cliff by using the cliff detection sensor, and decide whether to pass the cliff or not according to the determination result. For example, the control unit 1800 determines presence or non-presence of a cliff and a depth of the cliff through the cliff sensor, and then allows the mobile robot to pass through the cliff only when a reflection signal is detected through the cliff sensor.

As another example, the control unit 1800 may also determine lifting of the mobile robot using the cliff sensor.

On the other hand, the two-dimensional camera sensor is provided on one surface of the mobile robot to acquire image information related to the surroundings of the main body during movement.

An optical flow sensor converts a lower image input from an image sensor provided in the sensor to generate image data of a predetermined format. The generated image data may be stored in the memory 1700.

Also, at least one light source may be installed adjacent to the optical flow sensor. The at least one light source emits light to a predetermined area of the floor, which is captured by the image sensor. That is, while the mobile robot moves in a specific area along the floor surface, a certain distance is maintained between the image sensor and the floor surface when the floor surface is flat. On the other hand, when the mobile robot moves on a floor surface which is not flat, the image sensor and the floor surface are spaced apart from each other by a predetermined distance due to an unevenness and an obstacle on the floor surface. At this time, the at least one light source may be controlled by the control unit 1800 to adjust an amount of light to be emitted. The light source may be a light emitting device, for example, a light emitting diode (LED), which is capable of adjusting an amount of light.

The control unit 1800 may detect a position of the mobile robot irrespective of slippage of the mobile robot, using the optical flow sensor. The control unit 1800 may compare and analyze image data captured by the optical flow sensor according to time to calculate a moving distance and a moving direction, and calculate a position of the mobile robot based on the calculated moving distance and moving direction. By using the image information regarding the lower side of the mobile robot captured by the image sensor, the control unit 1800 may perform correction that is robust against slippage with respect to the position of the mobile robot calculated by another member.

The three-dimensional (3D) camera sensor may be attached to one surface or a part of the main body of the mobile robot to generate 3D coordinate information related to surroundings of the main body.

That is, the 3D camera sensor may be a 3D depth camera that calculates a remote/near distance between the mobile robot and an object to be captured.

Specifically, the 3D camera sensor may capture 2D images related to surroundings of the main body, and generate a plurality of 3D coordinate information corresponding to the captured 2D images.

In one embodiment, the 3D camera sensor may be configured in a stereoscopic vision type which includes two or more cameras for acquiring 2D images, and merges at least two images acquired by the two or more cameras to generate a 3D coordinate information.

Specifically, the 3D camera sensor according to the embodiment may include a first pattern irradiating portion for downwardly irradiating light of a first pattern toward the front of the main body, a second pattern irradiating portion for upwardly irradiating light of a second pattern toward the front of the main body, and an image acquiring portion for acquiring a front image of the main body. Thus, the image acquiring portion may acquire an image of an area where the light of the first pattern and the light of the second pattern are incident.

In another embodiment, the 3D camera sensor may include an infrared pattern irradiating portion for irradiating an infrared pattern, in addition to a single camera, and capture a shape that the infrared pattern irradiated from the infrared pattern irradiating portion is projected onto an object to be captured, thereby measuring a distance between the 3D camera sensor and the object to be captured. The 3D camera sensor may be an IR type 3D camera sensor.

In another embodiment, the 3D camera sensor may include a light emitting portion for emitting light, in addition to a single camera. The 3D camera sensor may receive a part of laser light (or laser beam), which is emitted from the light emitting portion and reflected from an object to be captured, and analyze the received light, thereby measuring a distance between the 3D camera sensor and the object to be captured. The 3D camera sensor may be a time-of-flight (TOF) type 3D camera sensor.

Specifically, the laser of the 3D camera sensor is configured to irradiate a laser beam extending in at least one direction. In one example, the 3D camera sensor may be provided with first and second lasers. The first laser irradiates linear laser beams intersecting each other, and the second laser irradiates single linear laser beam. According to this, the lowermost laser is used to detect an obstacle on a bottom, the uppermost laser is used to detect an obstacle on a top, and an intermediate laser between the lowermost laser and the uppermost laser is used to detect an obstacle at a middle portion.

On the other hand, the communication unit 1100 is connected to a terminal device and/or another device (also referred to as "home appliance" herein) through one of wired, wireless and satellite communication methods, so as to transmit and receive signals and data.

The communication unit 1100 may transmit and receive data with another device located in a specific area. In this case, the other device may be any device if it can transmit and receive data through a network. For example, the other device may be an air conditioner, a heating device, an air purifier, a lamp, a TV, a vehicle, and the like. The other device may also be a device for controlling a door, a window, a water supply valve, a gas valve, or the like. The other device may also be a sensor for detecting temperature, humidity, air pressure, gas, or the like.

Further, the communication unit 1100 may communicate with another autonomous mobile robot 100 located in a specific area or within a predetermined range.

Figure 5A:
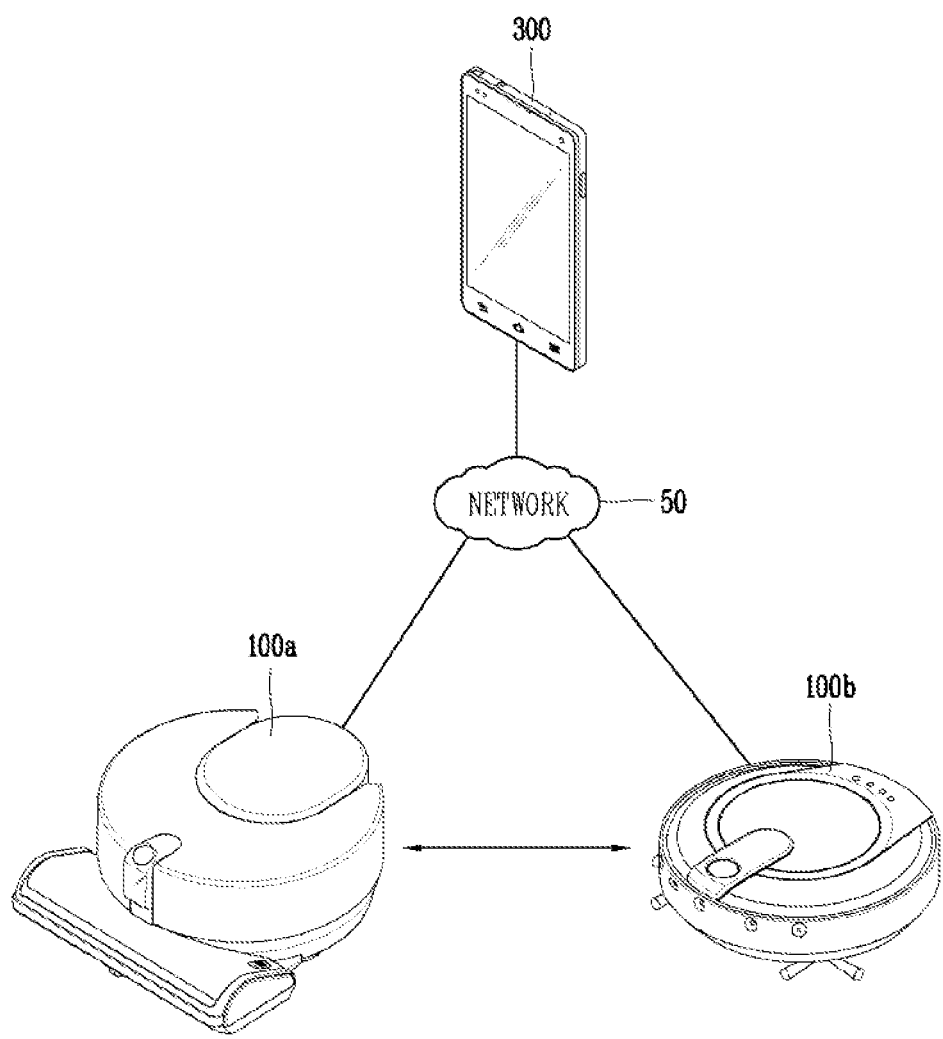
FIG. 5A is a conceptual view illustrating network communication between a plurality of autonomous mobile robots according to one embodiment of the present disclosure.
Figure 5B:
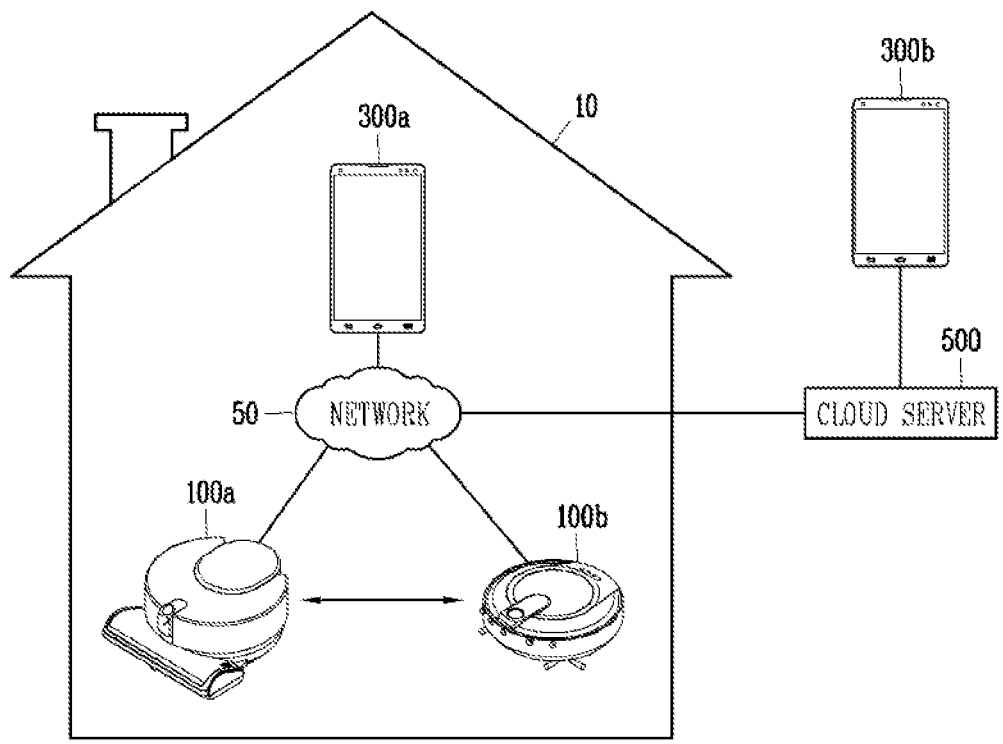
FIG. 5B is a conceptual view illustrating an example of the network communication of FIG. 5A.

Referring to FIGS. 5A and 5B, a first autonomous mobile robot 100a and a second autonomous mobile robot 100b may exchange data with each other through a network communication 50. In addition, the first autonomous mobile robot 100a and/or the second autonomous mobile robot 100b may perform a cleaning related operation or a corresponding operation by a control command received from a terminal 300 through the network communication 50 or other communication.

That is, although not shown, the plurality of autonomous mobile robots 100a and 100b may perform communication with the terminal 300 through a first network communication and perform communication with each other through a second network communication.

Here, the network communication 50 may refer to short-range communication using at least one of wireless communication technologies, such as a wireless LAN (WLAN), a wireless personal area network (WPAN), a wireless fidelity (Wi-Fi) Wi-Fi direct, Digital Living Network Alliance (DLNA), Wireless Broadband (WiBro), World Interoperability for Microwave Access (WiMAX), Zigbee, Z-wave, Blue-Tooth, Radio Frequency Identification (RFID), Infrared Data Association (IrDA), Ultrawide-Band (UWB), Wireless Universal Serial Bus (USB), and the like.

The network communication 50 may vary depending on a communication mode of the autonomous mobile robots desired to communicate with each other.

In FIG. 5A, the first autonomous mobile robot 100a and/or the second autonomous mobile robot 100b may provide information sensed by the respective sensing units thereof to the terminal 300 through the network communication 50. The terminal 300 may also transmit a control command generated based on the received information to the first autonomous mobile robot 100a and/or the second autonomous mobile robot 100b via the network communication 50.

In FIG. 5A, the communication unit of the first autonomous mobile robot 100a and the communication unit of the second autonomous mobile robot 100b may also directly communicate with each other or indirectly communicate with each other via another router (not shown), to recognize information related to a traveling state and positions of counterparts.

In one example, the second autonomous mobile robot 100b may perform a traveling operation and a cleaning operation according to a control command received from the first autonomous mobile robot 100a. In this case, it may be said that the first autonomous mobile robot 100a operates as a master cleaner and the second autonomous mobile robot 100b operates as a slave cleaner. Alternatively, it can be said that the second autonomous mobile robot 100b follows up the first autonomous mobile robot 100a. In some cases, it may also be said that the first autonomous mobile robot 100a and the second autonomous mobile robot 100b collaborate with each other.

Hereinafter, a system including a plurality of cleaners 100a and 100b performing autonomous traveling according to an embodiment of the present disclosure will be described with reference to FIG. 5B.

As illustrated in FIG. 5B, a cleaning system according to an embodiment of the present disclosure may include a plurality of cleaners 100a and 100b performing autonomous traveling, a network 50, a server 500, and a plurality of terminals 300a and 300b.

The plurality of cleaners 100a and 100b, the network 50 and at least one terminal 300a may be disposed in a building 10 while another terminal 300b and the server 500 may be located outside the building 10.

The plurality of cleaners 100a and 100b are cleaners that perform cleaning while traveling by themselves, and may perform autonomous traveling and autonomous cleaning. Each of the plurality of cleaners 100a and 100b may include a communication unit 1100, in addition to the traveling function and the cleaning function.

The plurality of cleaners 100a and 100b, the server 500 and the plurality of terminals 300a and 300b may be connected together through the network 50 to exchange data. To this end, although not shown, a wireless router such as an access point (AP) device and the like may further be provided. In this case, the terminal 300a located in the building (internal network) 10 may access at least one of the plurality of cleaners 100a and 100b through the AP device so as to perform monitoring, remote control and the like with respect to the cleaner. Also, the terminal 300b located in an external network may access at least one of the plurality of cleaners 100a and 100b through the AP device, to perform monitoring, remote control and the like with respect to the cleaner.

The server 500 may be wirelessly connected directly through the terminal 300b. Alternatively, the server 500 may be connected to at least one of the plurality of cleaners 100a and 100b without passing through the mobile terminal 300b.

The server 500 may include a programmable processor and may include various algorithms. By way of example, the server 500 may be provided with algorithms related to performing machine learning and/or data mining. As an example, the server 500 may include a speech recognition algorithm. In this case, when receiving voice data, the received voice data may be output by being converted into data in a text format.

The server 500 may store firmware information, operation information (course information and the like) related to the plurality of cleaners 100a and 100b, and may register product information regarding the plurality of cleaners 100a and 100b. For example, the server 500 may be a server operated by a cleaner manufacturer or a server operated by an open application store operator.

In another example, the server 500 may be a home server that is provided in the internal network 10 and stores status information regarding the home appliances or stores contents shared by the home appliances. If the server 500 is a home server, information related to foreign substances, for example, foreign substance images and the like may be stored.

Meanwhile, the plurality of cleaners 100a and 100b may be directly connected to each other wirelessly via Zigbee, Z-wave, Blue-Tooth, Ultrawide band, and the like. In this case, the plurality of cleaners 100a and 100b may exchange position information and traveling information with each other.

At this time, any one of the plurality of cleaners 100a and 100b may be a master cleaner 100a and another may be a slave cleaner 100b.

In this case, the first mobile robot 100a may control traveling and cleaning of the second mobile robot 100b. In addition, the second mobile robot 100b may perform traveling and cleaning while following up the first mobile robot 100a. Here, the operation or action that the second mobile robot 100b follows up the first mobile robot 100a refers to that the second mobile robot 100b performs traveling and cleaning while following up the first mobile robot 100a with maintaining a proper distance from the first mobile robot 100a.

Figure 5C:
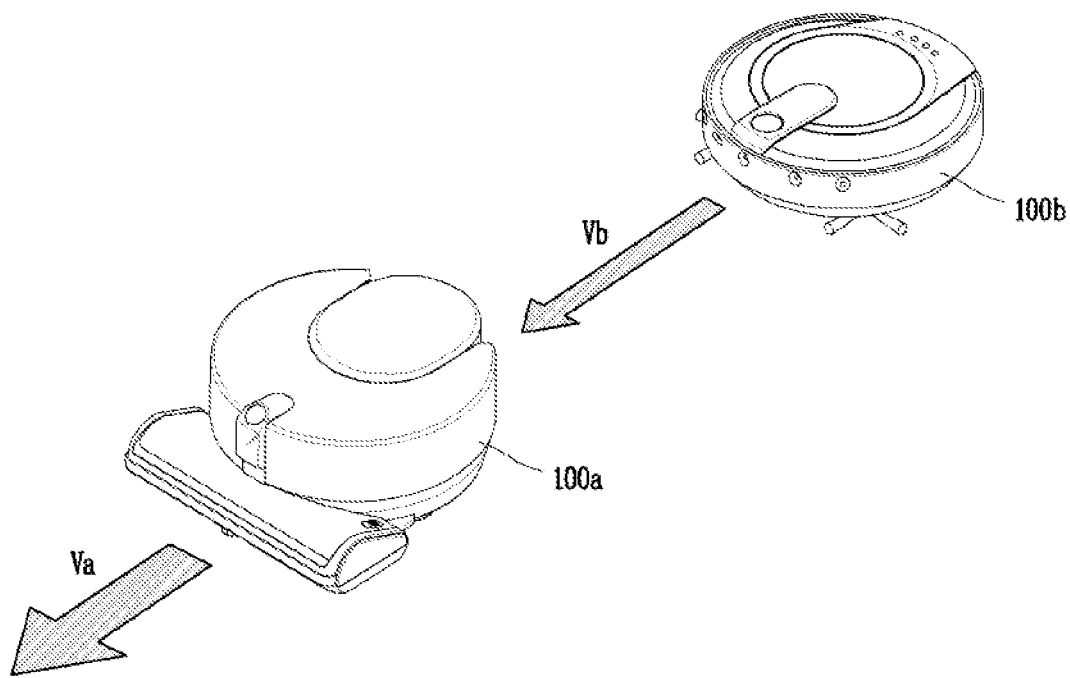
FIG. 5C is a conceptual view illustrating a following travel of a plurality of autonomous mobile robots according to one embodiment of the present disclosure.

Referring to FIG. 5C, the first mobile robot 100a controls the second mobile robot 100b such that the second mobile robot 100b follows up the first mobile robot 100a.

For this purpose, the first mobile robot 100a and the second mobile robot 100b should exist in a specific area where they can communicate with each other, and the second mobile robot 100b should recognize at least a relative position of the first mobile robot 100a.

For example, the communication unit of the first mobile robot 100a and the communication unit of the second mobile robot 100b exchange IR signals, ultrasonic signals, carrier frequencies, impulse signals, and the like, and analyze them through triangulation, so as to calculate movement displacements of the first mobile robot 100a and the second mobile robot 100b, thereby recognizing relative positions of the first mobile robot 100a and the second mobile robot 100b. However, the present disclosure is not limited to this method, and one of the various wireless communication technologies described above may be used to recognize the relative positions of the first mobile robot 100a and the second mobile robot 100b through triangulation or the like.

When the first mobile robot 100a recognizes the relative position with the second mobile robot 100b, the second mobile robot 100b may be controlled based on map information stored in the first mobile robot 100a or map information stored in the server, the terminal or the like. In addition, the second mobile robot 100b may share obstacle information sensed by the first mobile robot 100a. The second mobile robot 100b may perform an operation based on a control command (for example, a control command related to a traveling direction, a traveling speed, a stop, etc.) received from the first mobile robot 100a.

Specifically, the second mobile robot 100b performs cleaning while traveling along a traveling path of the first mobile robot 100a. However, the traveling directions of the first mobile robot 100a and the second mobile robot 100b do not always coincide with each other. For example, when the first mobile robot 100a moves or rotates up/down/right/left, the second mobile robot 100b may move or rotate up/down/right/left after a predetermined time, and thus current advancing directions of the first and second mobile robot 100a and 100b may differ from each other.

Also, a traveling speed Va of the first mobile robot 100a and a traveling speed Vb of the second mobile robot 100b may be different from each other.

The first mobile robot 100a may control the traveling speed Vb of the second mobile robot 100b to be varied in consideration of a distance at which the first mobile robot 100a and the second mobile robot 100b can communicate with each other. For example, if the first mobile robot 100a and the second mobile robot 100b move away from each other by a predetermined distance or more, the first mobile robot 100a may control the traveling speed Vb of the second mobile robot 100b to be faster than before. On the other hand, when the first mobile robot 100a and the second mobile robot 100b move close to each other by a predetermined distance or less, the first mobile robot 100a may control the traveling speed Vb of the second mobile robot 100b to be slower than before or control the second mobile robot 100b to stop for a predetermined time. Accordingly, the second mobile robot 100b can perform cleaning while continuously following up the first mobile robot 100a.

According to the present disclosure, the first mobile robot 100a may be provided with reception sensors on front and rear sides, so that the control unit of the first mobile robot 100a can recognize a receiving direction of an optical signal received from the second mobile robot 100b by distinguishing the front and rear sides. To this end, a UWB module may be provided at the rear of the first mobile robot 100a and another UWB module or a plurality of optical sensors may be disposed at the front of the first mobile robot 100a in a spacing manner. The first mobile robot 100a may recognize a receiving direction of an optical signal received from the second mobile robot 100b and determine whether the second mobile robot 100b is coming from behind it or is located at the front of it.

Figure 6A:
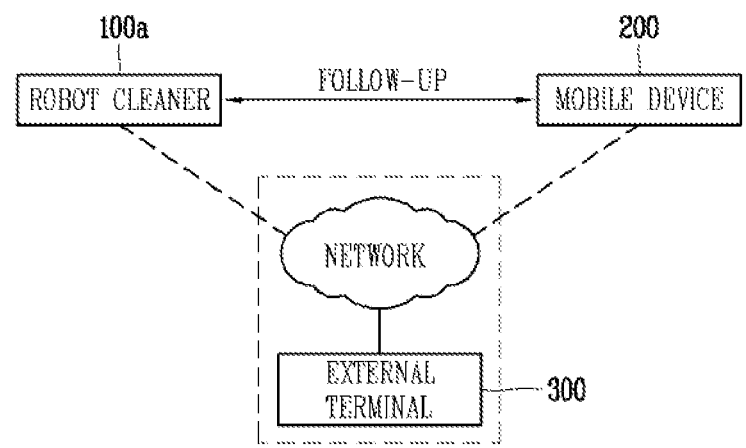
FIGS. 6A, 6B and 6C are conceptual views illustrating follow-up registration and follow-up control between a first mobile robot and a mobile device, according to an alternative embodiment of the present disclosure.
Figure 6B:
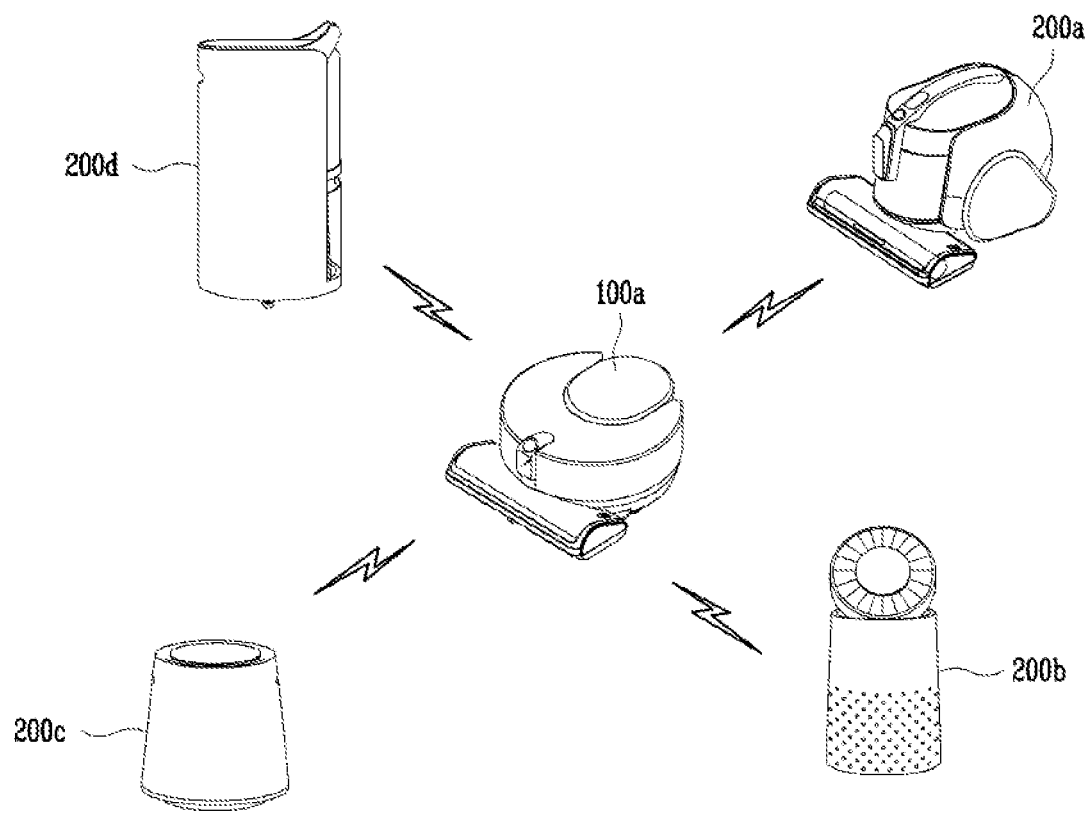
Figure 6C:
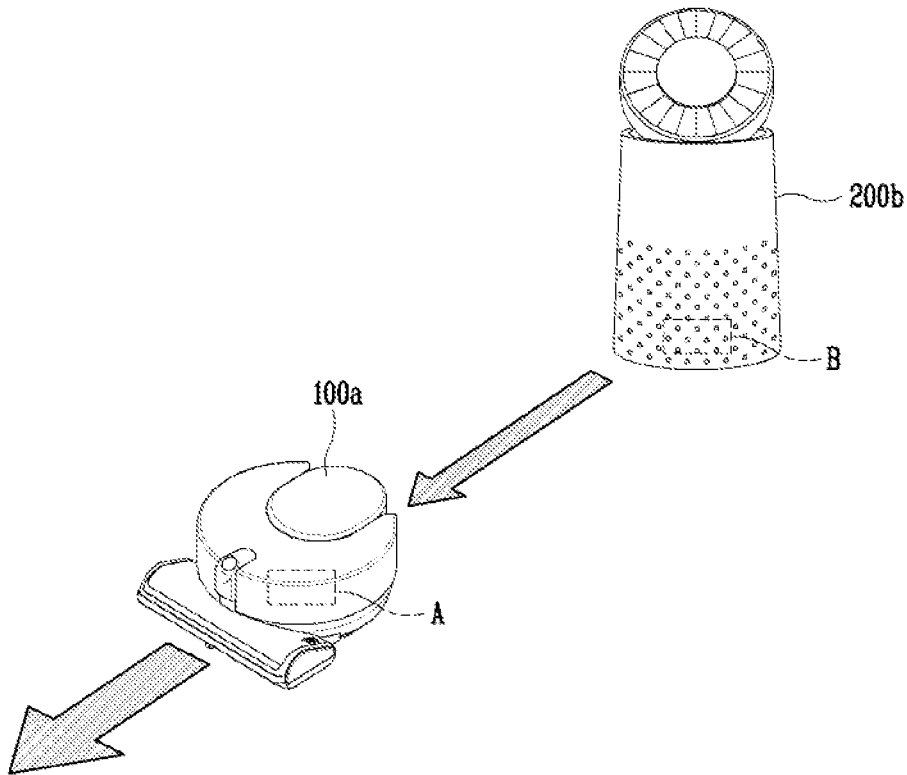

FIGS. 6A, 6B, and 6C are alternative embodiments of follow-up control between the first mobile robot and the second mobile robot in accordance with the present disclosure. Hereinafter, a follow-up control between the first mobile robot and a mobile device will be described in detail. Here, the follow-up control disclosed herein means only that the mobile device follows a movement path of the first mobile robot.

Referring to FIG. 6A, the first mobile robot 100a may control the follow-up of a mobile device 200 by communicating with the mobile device 200 instead of the second mobile robot.

Here, the mobile device 200 may not have a cleaning function, and may be any electronic device if it is provided with a driving function. For example, the mobile device 200 may include various types of home appliances or other electronic devices, such as a dehumidifier, a humidifier, an air purifier, an air conditioner, a smart TV, an artificial intelligent speaker, a digital photographing device, and the like, with no limit.

In addition, the mobile device 200 may be any device if it is equipped with a traveling function, and may not have a navigation function for detecting an obstacle by itself or traveling up to a predetermined destination.

The first mobile robot 100a is a mobile robot having both the navigation function and the obstacle detection function and can control the follow-up of the mobile device 200. The first mobile robot 100a may be a dry-type cleaner or a wet-type cleaner.

The first mobile robot 100a and the mobile device 200 can communicate with each other through a network (not shown), but may directly communicate with each other.

Here, the communication using the network is may be communication using, for example, WLAN, WPAN, Wi-Fi, Wi-Fi Direct, Digital Living Network Alliance (DLNA), Wireless Broadband (WiBro), World Interoperability for Microwave Access (WiMAX), etc. The mutual direct communication may be performed using, for example, UWB, Zigbee, Z-wave, Blue-Tooth, RFID, and Infrared Data Association (IrDA), and the like.

If the first mobile robot 100a and the mobile device 200 are close to each other, the mobile device 200 may be set to follow the first mobile robot 100a through a manipulation in the first mobile robot 100a.

If the first mobile robot 100a and the mobile device 200 are far away from each other, although not shown, the mobile device 200 may be set to follow the first mobile robot 100a through a manipulation in an external terminal 300 (see FIG. 5A).

Specifically, follow-up relationship between the first mobile robot 100a and the mobile device 200 may be established through network communication with the external terminal 300 (see FIG. 5A). Here, the external terminal 300 is an electronic device capable of performing wired or wireless communication, and may be a tablet, a smart phone, a notebook computer, or the like. At least one application related to follow-up control by the first mobile robot 100a (hereinafter, 'follow-up related application') may be installed in the external terminal 300. The user may execute the follow-up related application installed in the external terminal 300 to select and register the mobile device 200 subjected to the follow-up control by the first mobile robot 100a. When the mobile device 200 subjected to the follow-up control is registered, the external terminal may recognize product information of the mobile device, and such product information may be provided to the first mobile robot 100a via the network.

The external terminal 300 may recognize the position of the first mobile robot 100a and the position of the registered mobile device 200 through communication with the first mobile robot 100a and the registered mobile device 200. Afterwards, the first mobile robot 100a may travel toward the position of the registered mobile device 200 or the registered mobile device 200 may travel toward the position of the first mobile robot 100a according to a control signal transmitted from the external terminal 300. When it is detected that the relative positions of the first mobile robot 100a and the registered mobile device 200 are within a predetermined following distance, the follow-up control for the mobile device 200 by the first mobile robot 100a is started. After then, the follow-up control is performed by direct communication between the first mobile robot 100a and the mobile device 200 without the intervention of the external terminal 300.

The setting of the follow-up control may be released by the operation of the external terminal 300 or automatically terminated as the first mobile robot 100a and the mobile device 200 move away from the predetermined following distance.

The user can change, add or remove the mobile device 200 to be controlled by the first mobile robot 100a by manipulating the first mobile robot 100a or the external terminal 300. For example, referring to FIG. 6B, the first mobile robot 100a may perform the follow-up control for at least one mobile device 200 of another cleaner 200a or 100b, an air purifier 200b, a humidifier 200c, and a dehumidifier 200d.

Generally, since the mobile device 200 is different from the first mobile robot 100a in its function, product size, and traveling ability, it is difficult for the mobile device 200 to follow the movement path of the mobile robot 100a as it is. For example, there may be an exceptional situation in which it is difficult for the mobile device 200 to follow the movement path of the first mobile robot 100a according to a geographical characteristic of a space, a size of an obstacle, and the like. In consideration of such an exceptional situation, the mobile device 200 may travel or wait by omitting a part of the movement path even if it recognizes the movement path of the first mobile robot 100a. To this end, the first mobile robot 100a may detect whether or not the exceptional situation occurs, and control the mobile device 200 to store data corresponding to the movement path of the first mobile robot 100a in a memory or the like. Then, depending on situations, the first mobile robot 100a may control the mobile device 200 to travel with deleting part of the stored data or to wait in a stopped state.

FIG. 6C illustrates an example of a follow-up control between the first mobile robot 100a and the mobile device 200, for example, the air cleaner 200b having a traveling function. The first mobile robot 100a and the air purifier 200b may include communication modules A and B for determining relative positions thereof, respectively. The communication modules A and B may be one of modules for emitting and receiving an IR signal, an ultrasonic signal, a carrier frequency, or an impulse signal. The recognition of the relative positions through the communication modules A and B has been described above in detail, so a description thereof will be omitted. The air purifier 200b may receive traveling information corresponding to a traveling command (e.g., changes in traveling including a traveling direction and a traveling speed, traveling stop, etc.) from the first mobile robot 100a, travel according to the received traveling information, and perform air purification. Accordingly, the air purification may be performed in real time with respect to a cleaning space in which the first mobile robot 100a operates. In addition, since the first mobile robot 100a has already recognized the production information related to the mobile device 200, the first mobile robot 100a can control the air purifier 200b to record the traveling information of the first mobile robot 100a, and travel with deleting part of the traveling information or wait in a stopped state.

Hereinafter, description will be given in more detail of a method in which a plurality of mobile robots performs a smooth following travel in accordance with one embodiment of the present disclosure, with reference to the accompanying drawings.

The first autonomous mobile robot 100a of the present disclosure may be referred to as a first cleaner or a first mobile robot 100a and the second autonomous mobile robot 100b may be referred to as a second cleaner or a second mobile robot 100b.

Also, in the present disclosure, the first mobile robot 100a serves as a leading cleaner (or master cleaner) that travels in a direction ahead of the second mobile robot 100b, and the second mobile robot 100b serves as a following cleaner (or slave cleaner) that follows up the first mobile robot 100a.

The first and second mobile robots 100a and 100b may perform traveling and cleaning in a following manner without user's intervention.

It should be noted in the present disclosure that following travel and cleaning are performed through direct communication between the first mobile robot 100a and the second mobile robot 100b, other than communication between the first mobile robot 100a and the second mobile robot 100b through a separate server.

In order for the second mobile robot 100b to follow the first mobile robot 100a, the second mobile robot 100b should determine or recognize the relative position of the first mobile robot 100a.

The second mobile robot 100b may detect a position of the first mobile robot 100a or a traveling path (or movement path) that the first mobile robot 100a has traveled, in order to follow the first mobile robot 100a.

Hereinafter, a method in which the second mobile robot 100*b* travels while following the first mobile robot 100*a* will be described in more detail with reference to the accompanying drawings.

For convenience of explanation, the function/operation/control method of the second mobile robot 100*b* will be mainly described herein.

The first mobile robot 100*a* may perform cleaning while moving in a space, in which the first mobile robot 100*a* can travel, according to a preset algorithm (for example, a cleaning algorithm, a traveling algorithm, etc.).

The second mobile robot 100*b* may perform a following travel that it moves (cleans) with following the first mobile robot 100*a* while the first mobile robot 100*a* is moving.

On the other hand, the first mobile robot 100*a* and the second mobile robot 100*b* may exist in a state of facing arbitrary directions at arbitrary positions before starting cleaning while performing the following travel.

For example, the first mobile robot 100*a* and the second mobile robot 100*b* may start cleaning (or traveling) in charging bases of the respective cleaners. At this time, the charging bases of the respective cleaners may be installed at various positions by the user, and the installation direction may also be various.

That is, the first mobile robot 100*a* and the second mobile robot 100*b* may be located at arbitrary positions before starting the following travel, and may be arranged to face arbitrary directions.

In order for the second mobile robot 100*b* to follow the first mobile robot 100*a*, the second mobile robot 100*b* should determine or recognize the relative position of the first mobile robot 100*a*. This is because the following travel can be smoothly performed only when it is started after the arrangement state of the second mobile robot 100*b* and the first mobile robot 100*a* is accurately determined.

Coordinates of the first mobile robot 100*a* may include information regarding a relative position of the first mobile robot 100*a* with respect to the second mobile robot 100*b*, and angle information indicating a direction that the first mobile robot 100*a* faces.

The present disclosure may recognize not only the relative position information of the first mobile robot 100*a* but also the angle information indicating the direction that the first mobile robot 100*a* faces, so as to estimate (predict) in which direction the first mobile robot 100*a* is to move when starting the following travel.

Accordingly, the present disclosure can naturally (smoothly or seamlessly) start the following travel when the second mobile robot 100*b* starts the following travel with respect to the first mobile robot 100*a*.

That is, the present disclosure may be understood as a starting scenario for the second mobile robot 100*b* to travel while following the first mobile robot 100*a*.

The present disclosure can provide a method of synchronizing coordinates of the first mobile robot 100*a* and the second mobile robot 100*b* with each other by recognizing even the direction that the first mobile robot 100*a* faces as well as the relative position of the first mobile robot 100*a* when the second mobile robot 100*b* starts the following travel for the first mobile robot 100*a*.

The present disclosure (or the second mobile robot 100*b*) may determine the relative position of the first mobile robot 100*a* and the direction that the first mobile robot 100*a* faces when starting the following travel, and control at least one of the first mobile robot 100*a* and the second mobile robot 100*b* to be arranged in an optimized state for the following travel.

The present disclosure can provide a starting scenario in which the second mobile robot 100*b* can start to follow the first mobile robot 100*a* in an ideal arrangement state, by allowing the following travel to be started after the first mobile robot 100*a* and the second mobile robot 100*b* are arranged in an optimized state for the following travel.

Since this specification describes the control method of the second mobile robot 100*b*, the second mobile robot 100*b* is referred to as a main body or a mobile robot, and the first mobile robot 100*a* is referred to as another mobile robot.

Hereinafter, description will be given of a method in which a mobile robot determines coordinates (relative position, a direction that another mobile robot faces) of the other mobile robot, so that the mobile robot can follow the other mobile robot, with reference to the accompanying drawings.

Figure 7:
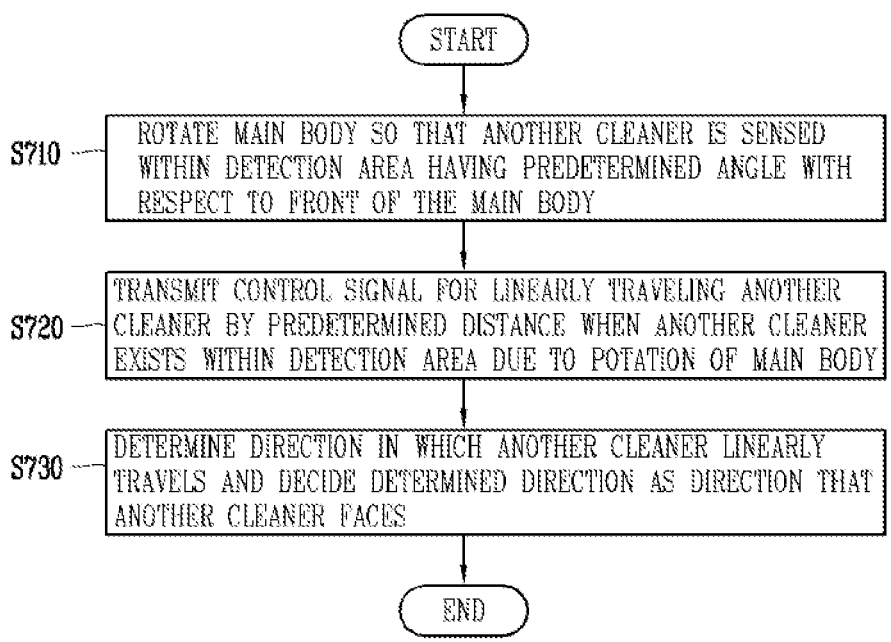
FIG. 7 is a flowchart illustrating a representative control method according to the present disclosure.

FIG. 7 is a flowchart illustrating a representative control method according to the present disclosure, and FIGS. 8, 9, 10 and 11 are conceptual views illustrating the control method illustrated in FIG. 7.

First, the mobile robot (second mobile robot) 100*b* of the present disclosure may include a traveling unit 1300 that moves or rotates the main body 100*b* itself, a communication unit 1100 that performs communication with the other mobile robot (first mobile robot) 100*a*, and a sensing unit 1400 that senses (detects) the other mobile robot 100*a* which is located within a detection area (sensing area) encompassing a predetermined projected angle with respect to the front of the main body 100*b*. The sensing unit 1400 may sense the other mobile robot 100*a* in the detection area having the predetermined projected angle with respect to the front of the main body 100*b*.

The mobile robot 100*b* of the present disclosure may also include a control unit 1800 that controls the traveling unit 1300 based on information sensed (received) through the sensing unit 1400 and/or the communication unit 1100.

In this specification, the description that the control unit 1800 moves the main body or rotates the main body may mean that the control unit 1800 controls the traveling unit 1300 so that the main body moves or rotates.

Figure 8:
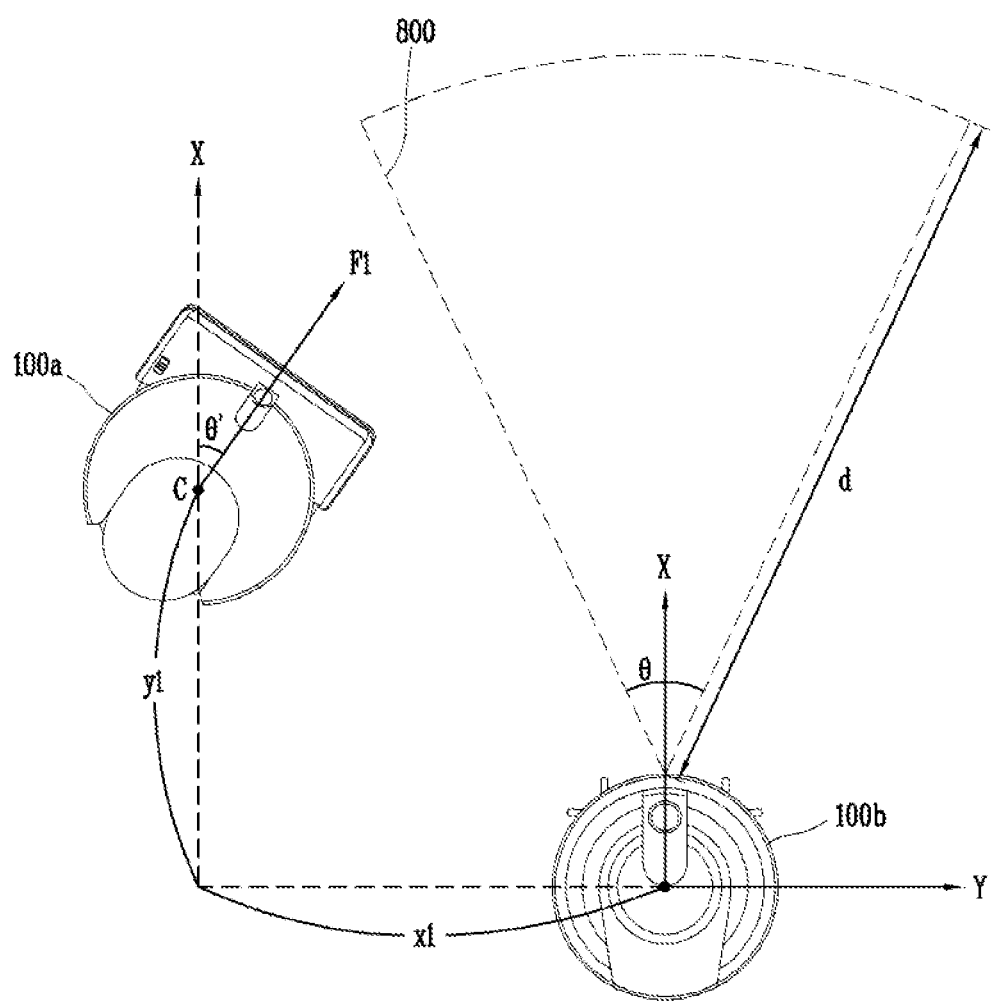
FIGS. 8, 9, 10, and 11 are conceptual views illustrating the control method illustrated in FIG. 7.

Referring to FIG. 8, the mobile robot (second mobile robot) 100*b* of the present disclosure may include a sensing unit 1400 that senses the other mobile robot (first mobile robot) 100*a* existing in a detection area 800 encompassing a predetermined projected angle θ (e.g., −n° to +n° (e.g., −45° to +45°) with respect to the front of the main body 100*b*.

The control unit 1800 of the mobile robot 100*b* may sense the other mobile robot 100*a* existing within a predetermined distance d of the detection area 800.

The detection area 800 may encompass a range which has the predetermined projected angle θ and has the predetermined distance d as a radius. In addition, the detection area 800 may mean an area (range) in which predetermined information can be sensed by the sensing unit 1400.

The predetermined projected angle θ and the predetermined distance d of the detection area 800 that can be sensed by the sensing unit 1400 may be determined according to a type of sensor which is provided in the sensing unit 1400 for a sensing operation or determined/changed by user setting.

For example, the sensing unit 1400 may include at least one of an optical sensor, a laser (infrared (IR)) sensor, an ultrasonic sensor, a Ultra-WideBand (UWB) sensor, one of wireless communication technologies (for example, Zigbee, Z-wave, Blue-Tooth and UWB), an external signal detection sensor (or external signal sensor), a front detection sensor (or front sensor), a cliff detection sensor (or cliff sensor), a two-dimensional (2D) camera sensor, and a three-dimensional (3D) camera sensor, or may be configured by combination of at least two of those sensors.

In addition, when the sensing unit 1400 senses another mobile robot (or information related to the other mobile robot) in the detection area using one of the wireless communication technologies, the sensing unit 1400 may include the communication unit 1100 or may be replaced with the communication unit 1100.

The present disclosure can control the second mobile robot to follow the first mobile robot while keeping a predetermined interval range (or predetermined distance) from the first mobile robot. The predetermined interval range (for example, 50 to 70 cm) may include values which are smaller than the predetermined distance d (e.g., 2 to 100 m) of the detection area 800. In this specification, for the sake of convenience of description, in description of the detection area 800, the predetermined distance d of the detection area will not be mentioned and the detection area will be described as having a predetermined projected angle with respect to the front of the main body.

The control unit 1800 may sense various information in the detection area 800 through the sensing unit 1400.

For example, the control unit 1800 may sense another mobile robot existing in the detection area 800 through the sensing unit 1400 or sense information related to the other mobile robot existing in the detection area 800.

The information related to the other mobile robot may include a relative position between the other mobile robot 100*a* and the main body 100*b*, a traveling path of the other mobile robot 100*a*, a position (point) at which the other mobile robot 100*a* has been located, a traveling direction of the other mobile robot 100*a*, and the like.

In addition, the information related to the other mobile robot may include information related to the movement of the other mobile robot.

The control unit 1800 may sense the other mobile robot in the detection area encompassing a predetermined projected angle with respect to the front of the main body (second mobile robot) 100*b* through the sensing unit 1400.

On the other hand, the mobile robot (second mobile robot) 100*b* and the other mobile robot (first mobile robot) 100*a*, as illustrated in FIG. 8, may be arranged at arbitrary positions before starting a following travel, and face arbitrary directions, respectively.

The control unit 1800 of the mobile robot 100*b* may start a process of determining (decide, estimating) coordinates of the other mobile robot 100*a*, in response to reception (or generation) of a control command (or start command) for starting the travel to follow the other mobile robot 100*a*.

The control command (start command) for starting the travel to follow the other mobile robot 100*a* (or a control command for following the other mobile robot 100*a*, or a control command for starting to follow the other mobile robot 100*a*) may be received (or generated) in various manners.

For example, the control command for starting the travel to follow the other mobile robot 100*a* may be received by a user request or through a button (input unit 1200) provided on the mobile robot 100*b* and/or the other mobile robot 100*a*.

As another example, the control unit 1800 of the mobile robot 100*b* may generate the control command for starting the travel to follow the other mobile robot 100*a*, in response to communication being established between the other mobile robot 100*a* and the mobile robot 100*b* after being turned on or in response to reception of a signal (or an arbitrary signal) indicating the start of traveling from the other mobile robot 100*a*.

The control unit 1800 of the mobile robot 100*b* may generate a reference coordinate system of the mobile robot (second mobile robot) based on a position of the mobile robot 100*b* and the direction that the mobile robot (or mobile robot main body) 100*b* faces at the time point when the control command has been received (generated).

For example, as illustrated in FIG. 8, the reference coordinate system may be made by an X axis facing the front of the mobile robot (or mobile robot main body) 100*b* and a Y axis perpendicular to the X axis, with respect to one point (e.g., center) of the mobile robot 100*b*.

The reference coordinate system may indicate a coordinate system serving as a reference for recognizing the positions of the first and second mobile robots 100*a* and 100*b*.

The reference coordinate system may be generated based on a movement start point of the mobile robot (second mobile robot) 100*b*. For example, the reference coordinate system may be generated based on the position of the mobile robot 100*b* and the direction that the mobile robot 100*b* faces at the received time point of the control command for starting the travel to follow the other mobile robot 100*a*.

The reference coordinate system may be fixed without being changed even if the mobile robot 100*b* is moved/rotated. From this perspective, the reference coordinate system of the mobile robot 100*b* may mean an absolute coordinate system. That is, the reference coordinate system may be an absolute coordinate system which is decided based on a position of the mobile robot 100*b* and a direction F2 that the mobile robot 100*b* faces at the time point when the second mobile robot 100*b* has received (generated) the control command (start command) for starting the travel to follow the other mobile robot 100*a*.

As illustrated in FIG. 8, the mobile robot (second mobile robot) 100*b* and the other mobile robot (first mobile robot) 100*a* may be arranged at arbitrary positions before starting a following travel, and face arbitrary directions, respectively.

In this state, when a control command for starting the travel to follow the other mobile robot 100*a* is received (generated), the control unit 1800 of the mobile robot 100*b* may generate a reference coordinate system based on a current position of the mobile robot 100*b* and a direction that the main body of the mobile robot 100*b* faces, and start a process of searching for (determining, estimating) coordinates of the other mobile robot 100*a*.

Here, the coordinates of the other mobile robot 100*a* may include coordinates (e.g., (x1, y1)) of a relative position of the other mobile robot 100*a* and an angle θ' indicating a direction F1 that the other mobile robot 100*a* faces (or an angle θ' that the front of the other mobile robot 100*a* faces), and may be determined in the form of (x1, y1, θ').

The coordinates of the relative position of the other mobile robot 100*a* may be, for example, coordinates indicating a relative position of a center c of the other mobile robot 100*a* with respect to a center of the mobile robot 100*b*.

In addition, the direction F1 that the other mobile robot 100*a* faces may refer to a direction that the front of the other mobile robot 100*a* faces.

The direction F1 that the other mobile robot 100*a* faces may correspond to an angle θ' by which the forward direction of the other mobile robot 100*a* (the direction that the other mobile robot 100*a* faces) is turned from the reference coordinate system (e.g., X axis) of the mobile robot 100*b*.

The relative position of the other mobile robot 100a and the direction that the other mobile robot 100a faces described herein may be determined (measured) based on the reference coordinate system of the mobile robot 100b.

At this time, as illustrated in FIG. 8, the other mobile robot 100a may be in a state not existing in the detection area 800 of the mobile robot 100b.

Referring to FIG. 7, in order for the mobile robot 100b to search for (identify) the other mobile robot 100a, the main body (mobile robot) 100b is rotated so that the other mobile robot 100a is sensed within the detection area 800 encompassing the predetermined projected angle with respect to the front of the mobile robot (mobile robot main body) 100b (S710).

Specifically, when a control command for starting the travel to follow the other mobile robot 100a, the control unit 1800 of the mobile robot 100b may sense (determine) whether or not the other mobile robot 100a exists within the detection area at a time point when the control command has been received (generated).

Here, if it is sensed that the other mobile robot 100a does not exist in the detection area 800 (that is, if the other mobile robot 100a is not sensed in the detection area 800), the control unit 1800 of the main body 100b may rotate the main body 100b so that the other mobile robot 100a is sensed within the detection area 800.

The control unit 1800 of the mobile robot 100b may control the traveling unit 1300 such that the main body 100b is rotated until the other mobile robot 100a is sensed in the detection area 800.

If the other mobile robot 100a is not sensed in the detection area 800, the control unit 1800 of the mobile robot 100b may control the main body 100b to rotate in a preset direction (e.g., to the left or to the right) and continuously determine whether or not the other mobile robot 100a is sensed in the detection area 800.

The control unit 1800 of the mobile robot 100b may stop the rotation of the main body 100b when the other mobile robot 100a is sensed in the detection area 800 due to the rotation of the main body 100b.

At this time, even if the other mobile robot 100a is sensed in the detection area 800, the control unit 1800 of the mobile robot 100b may rotate the main body 100b until a virtual line extending toward the front of the main body 100b penetrates through the center of the other mobile robot 100a.

That is, the control unit 1800 may stop the rotation of the main body 100b after rotating the main body 100b until the front surface of the main body 100b faces the center of the other mobile robot 100a.

Afterwards, when the other mobile robot 100a is present in the detection area 800 due to the rotation of the main body 100b, a control signal for causing linear travel of the other mobile robot 100a by a predetermined distance is transmitted to the other mobile robot 100a (S720).

Figure 9:
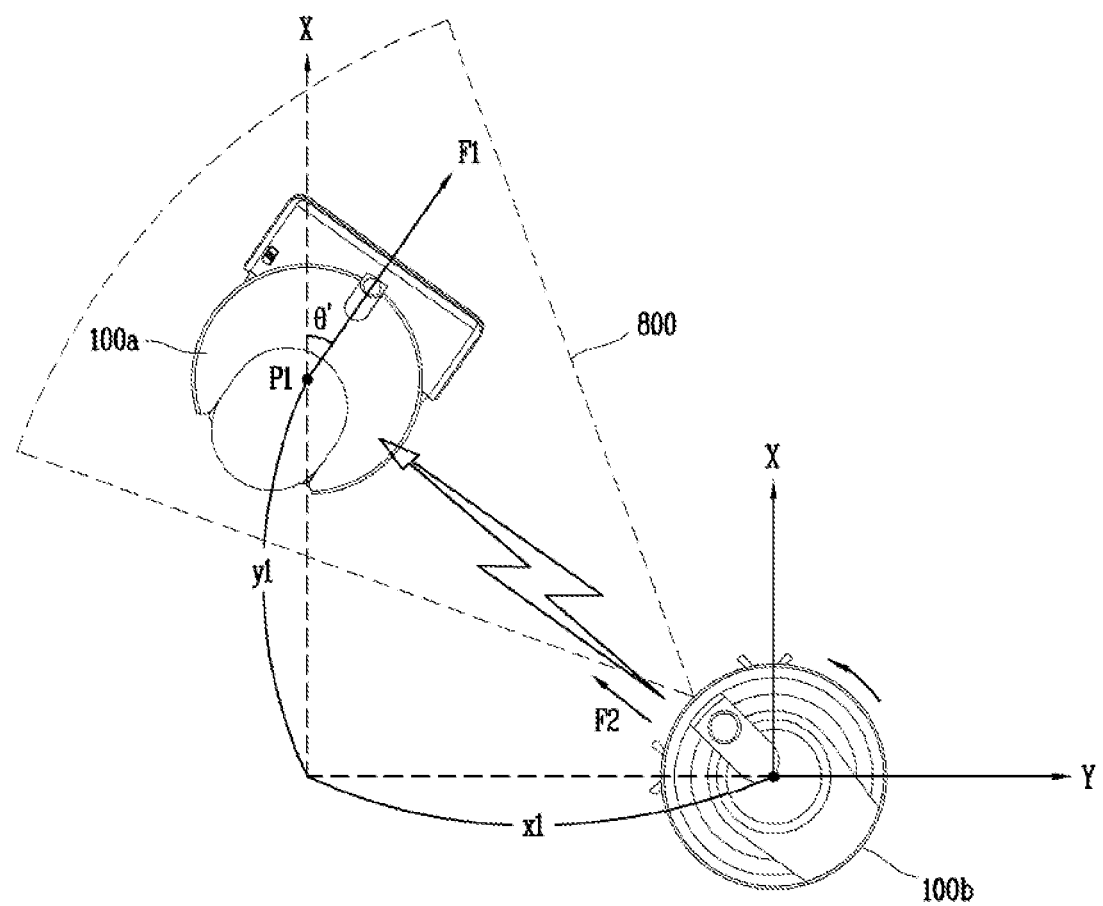

In detail, when the other mobile robot 100a is present in the detection area 800 by the rotation of the main body 100b (or when the main body 100b is turned such that its front surface faces the center of the other mobile robot 100a), as illustrated in FIG. 9, the control unit 1800 of the mobile robot 100b may control the communication unit 1100 to transmit the control signal for causing linear travel of the other mobile robot 100a by the predetermined distance to the other mobile robot 100a.

The control unit 1800 of the mobile robot 100b may determine the relative position of the other mobile robot 100a existing in the detection area 800. For example, the control unit 1800 may determine the relative position (x1, y1) of the other mobile robot 100a using at least one of the communication unit 1100 and the sensing unit 1400.

As one example, the mobile robot 100b may be provided with three distance-measuring sensors, and measure the relative position (x1, y1) of the other mobile robot 100a through triangulation using distances up to the other mobile robot 100a, which are measured by the three distance-measuring sensors, respectively.

The distance measuring sensor may include, for example, a laser sensor, an ultrasonic sensor, a UWB sensor (or a UWB module) or the like, and may also include various sensors included in the sensing unit 1400.

As another example, the control unit 1800 of the mobile robot 100b may measure a distance up to the other mobile robot 100a existing in the detection area 800 through the communication unit 1100 or the sensing unit 1400, and determine the relative position (x1, y1) of the other mobile robot 100a based on the measured distance and a rotated angle of the main body 100b.

In addition, the present disclosure can determine the relative position of the other mobile robot 100a by applying any method capable of measuring the relative position of the other mobile robot 100a based on the mobile robot 100b.

Meanwhile, the present disclosure can make the other mobile robot 100a linearly travel by a predetermined distance, in order to determine the direction F1 that the other mobile robot 100a faces (or angle information θ' indicating the direction F1) as well as the relative position of the other mobile robot 100a.

To this end, when the other mobile robot 100a exists in the detection area 800 by virtue of the rotation of the main body 100b, the control unit 1800 of the mobile robot 100b may control the communication unit 1100 to transmit the control signal for causing linear travel of the other mobile robot 100a by the predetermined distance to the other mobile robot 100a.

The other mobile robot 100a, which has received the control signal, may travel linearly by the predetermined distance.

Thereafter, in the present disclosure, a direction in which the other mobile robot travels linearly is determined and the determined direction is decided as a direction that the other mobile robot faces (S730).

More specifically, the control unit 1800 of the mobile robot 100b may determine the direction in which the other mobile robot 100a travels linearly through the sensing unit 1400. In addition, the control unit 1800 may decide the determined direction as the direction F1 that the other mobile robot 100a faces.

The direction F1 that the other mobile robot 100a faces refers to the direction F1 that the front surface of the other mobile robot 100a faces, and may be the same as (or correspond to) the direction in which the other mobile robot 100a travels linearly.

The direction F1 that the other mobile robot 100a faces may refer to or correspond to angle information θ' that the front surface of the other mobile robot (first mobile robot) 100a faces with respect to the reference coordinate system (e.g., X axis) of the mobile robot (second mobile robot) 100b (or angle information between a virtual line extending toward the front of the other mobile robot and the X axis).

The control unit 1800 of the mobile robot 100b may determine the relative position of the other mobile robot 100a through the sensing unit 1400.

Figure 10:
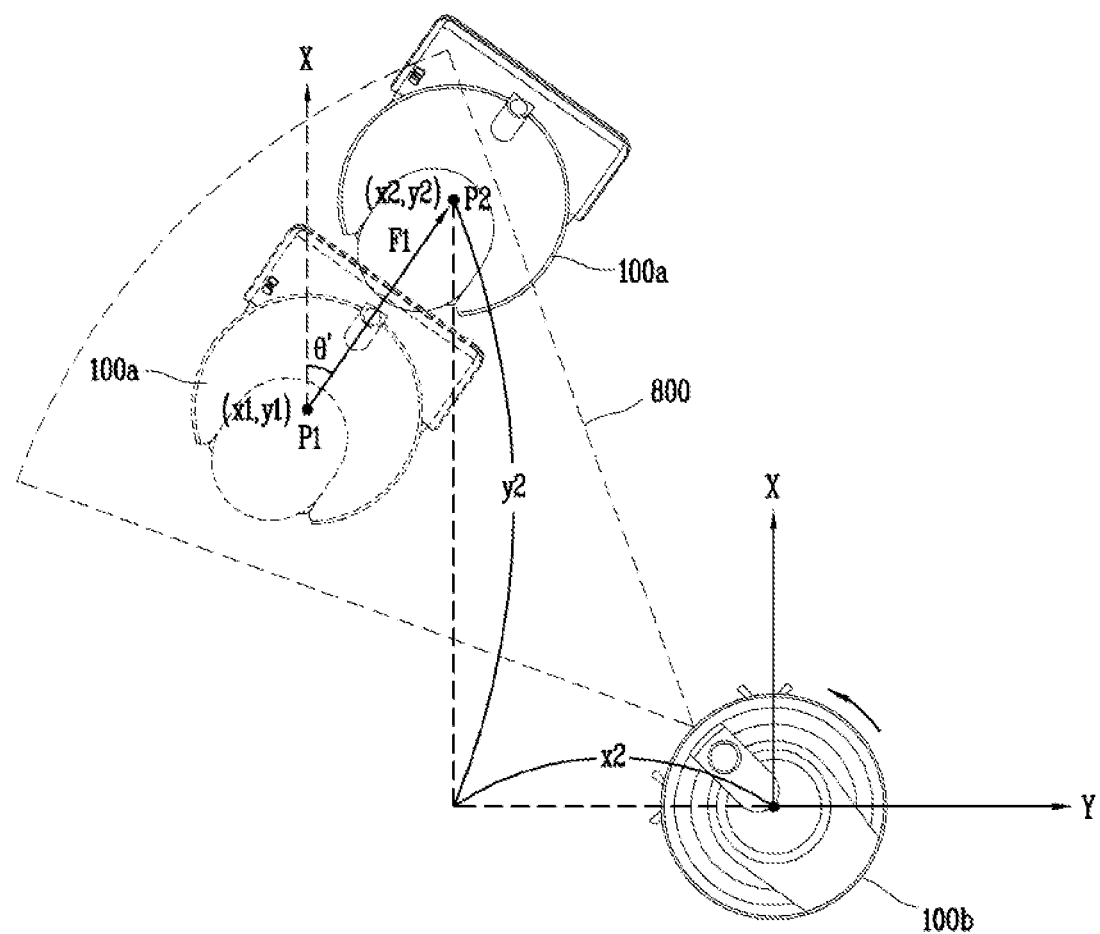

At this time, as illustrated in FIG. 10, the control unit 1800 of the mobile robot 100b may determine a plurality of relative positions (x1, y1), (x2, y2) of the other mobile robot 100*a* while the other mobile robot 100*a* is travelling in a linear direction.

Thereafter, the control unit 1800 of the mobile robot 100*b* may determine the direction F1 that the other mobile robot 100*a* faces (or the angle θ' indicating the direction F1) based on the plurality of relative positions (x1, y1), (x2, y2) of the other mobile robot.

That is, the control unit 1800 of the mobile robot 100*b* may determine position coordinates of the other mobile robot 100*a* and the angle θ' of the direction that the other mobile robot 100*a* faces, on the basis of the relative position of the other mobile robot 100*a* determined through the sensing unit 1400 and the direction that the other mobile robot faces.

For example, the control unit 1800 of the mobile robot 100*b* may determine the first relative position P1 (x1, y1) of the other mobile robot 100*a*, which has been sensed in the detection area 800 by the sensing unit 1400 due to the rotation of the main body 100*b*, before transmitting the control signal for causing linear travel of the other mobile robot by the predetermined distance.

The control unit 1800 of the mobile robot 100*b* may transmit the control signal for causing linear travel of the other mobile robot 100*a* by the predetermined distance, and then determine (measure) the plurality of relative positions (e.g., the first relative position P1 (x1, y1) and the second relative position P2 (x2, y2)) of the other mobile robot 100*a* through the sensing unit 1400 while the other mobile robot 100*a* linearly travels.

The plurality of relative positions may also include a first relative position P1 that is a movement start point of the other mobile robot 100*a*.

Although only the second relative position P2 is shown in FIG. 10, the control unit 1800 may measure a plurality of relative positions of the other mobile robot 100*a* while the other mobile robot 100*a* is traveling linearly.

The control unit 1800 of the mobile robot 100*b* may determine the direction F1 that the other mobile robot faces, based on the plurality of relative positions (the first and second relative positions P1 and P2).

The control unit 1800 of the mobile robot 100*b* may determine the direction that the other mobile robot 100*a* linearly travels based on the plurality of relative positions (the first and second relative positions P1 and P2), and decide the determined direction as the direction F1 that the other mobile robot 100*a* faces (or the direction that the front surface of the other mobile robot 100*a* faces).

The control unit 1800 of the mobile robot 100*b* may determine the angle θ' of the direction that the other mobile robot 100*a* faces with respect to the reference coordinate system of the mobile robot 100*b*, based on the direction that the other mobile robot 100*a* faces.

Figure 11:
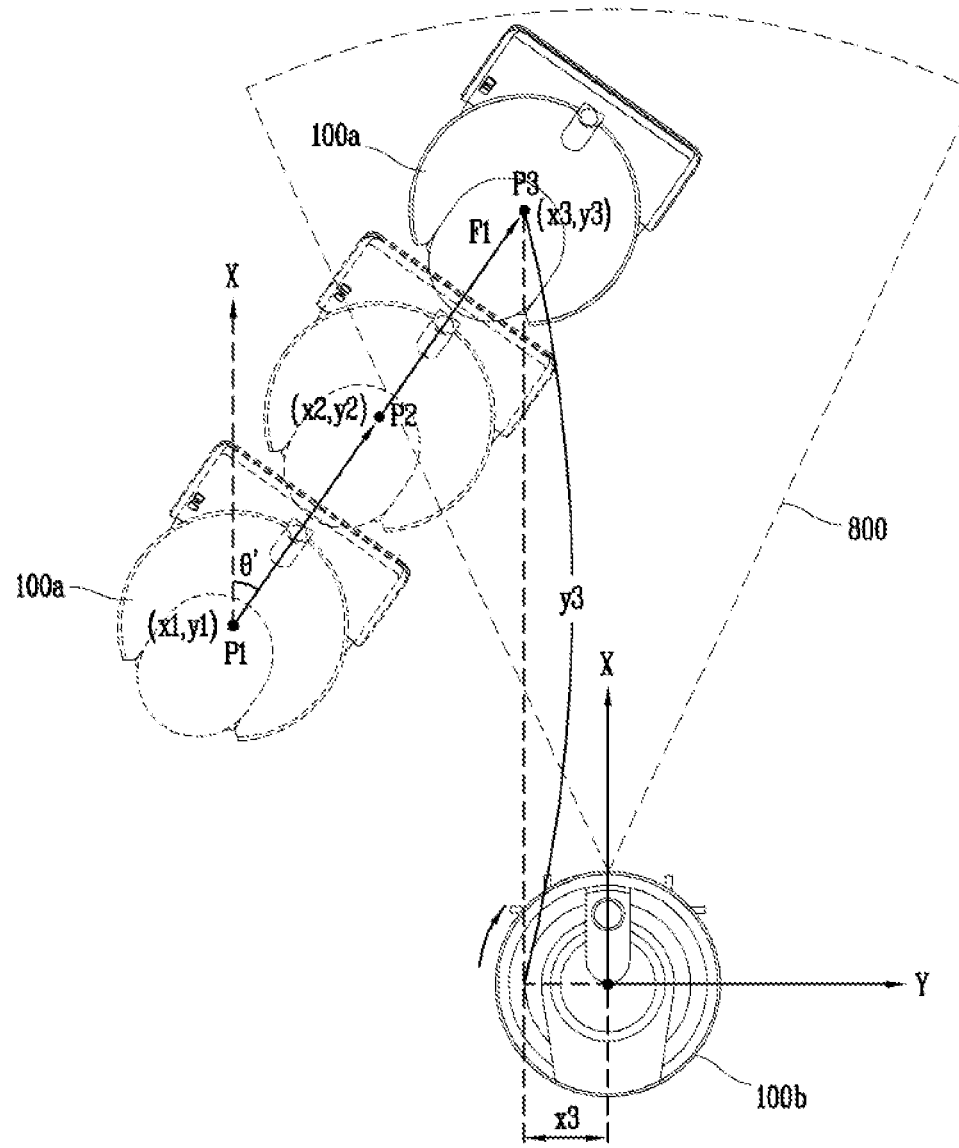

The control unit 1800 of the mobile robot 100*b*, as illustrated in FIG. 11, may determine the direction F1 that the other mobile robot 100*a* faces and the angle θ' of the direction F1 by using first to third relative positions P1, P2, and P3 of the other mobile robot.

The angle θ' of the direction F1 may refer to an angle between one axis (e.g., X axis) of the reference coordinate system of the mobile robot 100*b* and the direction F1.

As described above, the present disclosure can provide mobile robots that a mobile robot can determine an arranged state of another mobile robot (a relative position of the other mobile robot and a direction that the other mobile robot faces) more accurately by way of determining even the direction that the other mobile robot faces (or an angle of the direction) as well as the relative position of the other mobile robot, and a control method thereof.

That is, according to the present disclosure, when a control command for starting traveling to follow the other mobile robot is received, the other mobile robot may be controlled to linearly travel, which may result in determining even the direction that the other mobile robot faces (or a direction in which the other mobile robot is to travel) as well as the relative position of the other mobile robot which the mobile robot desires to follow).

Meanwhile, various modified embodiments may be applied to the control method described with reference to FIGS. 7 to 11.

For example, the control unit 1800 of the mobile robot 100*b* may rotate the main body 100*b*, in response to the determination of the relative position of the other mobile robot through the sensing unit 1400.

The sensing unit 1400 of the present disclosure may determine the relative position of the other mobile robot 100*a* even if the other mobile robot 100*a* does not exist in the detection area 800.

The sensing unit 1400 may include a UWB sensor that transmits and receives a UWB signal. The UWB sensor may transmit and receive signals in all directions.

The control unit 1800 may transmit and receive a UWB signal to and from the other mobile robot 100*a* through the UWB sensor included in the sensing unit 1400. When at least three UWB sensors are provided, the control unit 1800 may measure distances up to the other cleaner 100*a* through the at least three UWB sensors, and determine the relative position of the other mobile robot 100*a* through triangulation.

The sensing unit 1400 may further include an infrared (IR) sensor or an ultrasonic sensor, and may also determine the relative position of the other mobile robot 100*a* using the IR sensor or the ultrasonic sensor instead of the UWB sensor.

However, the control unit 1800 can determine the relative position of the other mobile robot but cannot determine the direction that the other mobile robot 100*a* faces.

The control unit 1800 may rotate the main body 100*b* until the other mobile robot 100*a* exists in the detection area 800, in response to the determination of the relative position of the other mobile robot 100*a*.

Afterwards, the control unit 1800 may transmit a control signal for linearly traveling the other mobile robot to the other mobile robot 100*a* when the other mobile robot 100*a* is sensed in the detection area 800.

Thereafter, the control unit 1800 may determine a plurality of relative positions while the other mobile robot 100*a* is traveling linearly, and may determine the direction that the other mobile robot 100*a* faces based on the determined relative positions.

As another example, the control unit 1800 of the mobile robot 100*b* may rotate the main body 100*b*, in response to the determination of the distance up to the other mobile robot through the sensing unit 1400.

The sensing unit 1400 of the present disclosure may determine the distance up to the other mobile robot 100*a* even if the other mobile robot 100*a* does not exist in the detection area 800.

The sensing unit 1400 may include a UWB sensor that transmits and receives a UWB signal. The UWB sensor may transmit and receive signals in all directions.

The control unit 1800 may transmit and receive a UWB signal to and from the other mobile robot 100*a* through the UWB sensor included in the sensing unit 1400. When one UWB sensor is provided, the control unit 1800 may determine (measure) the distance up to the other cleaner 100*a* through the one UWB sensor.

The sensing unit 1400 may further include an infrared (IR) sensor or an ultrasonic sensor, and may also determine (measure) the distance up to the other mobile robot 100*a* using the IR sensor or the ultrasonic sensor instead of the UWB sensor.

However, if there is one UWB sensor, the control unit 1800 can determine the distance up to the other mobile robot 100*a* but cannot determine the relative position of the other mobile robot 100*a* and the direction that the other mobile robot 100*a* faces.

The control unit 1800 may rotate the main body 100*b* until the other mobile robot 100*a* exists in the detection area 800, in response to the determination of the distance up to the other mobile robot 100*a*.

At this time, an antenna for outputting a signal from the other mobile robot 100*a* may be disposed at the center of the other mobile robot 100*a*.

In this case, the control unit 1800 may rotate the main body 100*b* so that a reference line facing the front of the main body 100*b* penetrates through the center of the other mobile robot 100*a* (i.e., so that the front surface of the main body 100*b* faces the center of the other mobile robot 100*a*), on the basis of intensity of a signal transmitted and received with the other mobile robot 100*a* within the detection area 800.

That is, the control unit 1800 may decide a time point, at which the intensity of the signal transmitted and received with the other mobile robot 100*a* is the highest, as a state where the front surface of the main body 100*b* faces the center of the other mobile robot 100*a*.

When the main body 100*b* is rotated so as to face the other mobile robot 100*a* in the detection area 800, the control unit 1800 may determine the relative position of the other mobile robot 100*a* based on a rotated degree (angle) of the main body 100*b* and the distance up to the other mobile robot 100*a*.

The control unit 1800 may then transmit a control signal for causing the other mobile robot to travel linearly to the other mobile robot 100*a*, in order to determine the direction that the other mobile robot 100*a* faces.

Thereafter, the control unit 1800 may determine a plurality of relative positions while the other mobile robot 100*a* is traveling linearly, and may determine the direction that the other mobile robot 100*a* faces based on the determined relative positions.

The foregoing description has been given of the method of rotating the main body 100*b* after determining the relative position of the other mobile robot 100*a* or the distance up to the other mobile robot 100*a*.

The control unit 1800 may rotate the main body 100*b* first when a control command (start command) for starting traveling to follow the other mobile robot 100*a* is received (generated). That is, the control unit 1800 may rotate the main body 100*b* such that the other mobile robot 100*a* exists in the detection area 800, in response to reception (or generation) of the control command.

The control unit 1800 may determine the relative position of the other mobile robot 100*a* through the sensing unit 1400 based on the presence of the other mobile robot 100*a* in the detection area 800 by virtue of the rotation of the main body 100*b*.

The relative position of the other mobile robot 100*a* existing in the detection area 800 may be determined by using a triangulation technique or the distance up to the other mobile robot 100*a* and the rotated degree (angle) of the main body 100*b*.

More specifically, the control unit 1800 may transmit and receive a UWB signal to and from the other mobile robot 100*a* through the sensing unit 1400, and determine the distance up to the other mobile robot 100*a* using the UWB signal.

Thereafter, the control unit 1800 may determine the relative position of the other mobile robot 100*a*, based on the rotated angle of the main body to allow the other mobile robot 100*a* to be located in the detection area 800 (or the rotated angle of the main body to allow the front surface of the main body to face the center of the other mobile robot) and the determined distance.

The rotated angle of the main body 100*b* may be measured based on the reference coordinate system of the mobile robot 100*b*. For example, the rotated angle may refer to the rotated angle of the main body 100*b* based on a direction (X axis) that the mobile robot 100*b* faces at a time point when a control command (start command) for starting traveling to follow the other mobile robot has been received.

The control unit 1800 may transmit a control signal for controlling the other mobile robot 100*a* to linearly travel by a predetermined distance to the other mobile robot 100*a* after the relative position of the other mobile robot 100*a* is determined within the detection area 800 after the rotation of the main body 100*b*.

Thereafter, the control unit 1800 may determine a plurality of relative positions while the other mobile robot 100*a* is traveling linearly, and may determine the direction that the other mobile robot 100*a* faces based on the determined relative positions.

That is, the present disclosure can first rotate the main body so that the other mobile robot is located within the detection area and then determine the relative position of the other mobile robot 100*a*.

Afterwards, the control unit 1800 may determine the direction that the other mobile robot 100*a* faces as well as the relative position of the other mobile robot 100*a* by controlling the other mobile robot 100*a* to travel linearly.

Although not illustrated in FIG. 10, the control unit 1800 of the mobile robot 100*b* may rotate the main body 100*b* so that the front surface (or the forward direction F1) of the main body 100*b* faces one point of the other mobile robot (e.g., the center of the other mobile robot).

For example, when the other mobile robot 100*a* moves in a linearly-traveling manner by the control signal for controlling the other mobile robot to linearly travel, the control unit 1800 of the mobile robot 100*b* may continuously rotate the main body 100*b* in response to the movement of the other mobile robot 100*a*, so that the front surface (or the forward direction F1) of the main body 100*b* continuously faces one point of the other mobile robot 100*a* (e.g., the center of the other mobile robot).

On the other hand, when the other mobile robot 100*a* is sensed in the detection area 800, the control unit 1800 may not rotate the main body. In this case, if only the other mobile robot 100*a* is located within the detection area 800, the control unit 1800 may not rotate the main body 100*b* even if the position of the other mobile robot 100*a* is changed within the detection area 800.

On the other hand, the other mobile robot 100*a* may continuously perform a linear travel by a predetermined distance based on the control signal for controlling it to linearly travel by the predetermined distance.

Accordingly, a case where the other mobile robot 100*a* is moved out of the detection area 800 of the mobile robot 100*b* may occur.

In this case, as illustrated in FIG. 11, when the other mobile robot 100*a* is moved out of the detection area 800 by the linear travel, the control unit 1800 may rotate the main body 100*b* to be located within the detection area again.

At this time, the control unit 1800 may determine a direction in which the other mobile robot 100*a* is moved out of the detection area 800 through the sensing unit 1400. For example, the control unit 1800 may determine a plurality of relative positions of the other mobile robot 100*a*, which is linearly traveling within the detection area 800, through the sensing unit 1400, and determine a traveling direction of the other mobile robot 100*a* based on the plurality of relative positions.

The control unit 1800 may determine the direction in which the other mobile robot 100*a* leaves the detection area 800 based on the determined traveling direction of the other mobile robot 100*a*.

Then, the control unit 1800 may rotate the main body 100*b* in a direction corresponding to the determined direction.

For example, the control unit 1800 may sense (or determine) through the sensing unit 1400 that the other mobile robot 100*a* is moving out of the detection area 800 in a left direction. The control unit 1800 may rotate the main body 100*b* to the left when the other mobile robot 100*a* is moving the detection area 800 in the left direction.

As another example, as illustrated in FIG. 11, the control unit 1800 may sense through the sensing unit 1400 that the other mobile robot 100*a* is moving out of the detection area 800 in a right direction. The control unit 1800 may rotate the main body 100*b* to the right when the other mobile robot 100*a* is moving out of the detection area 800 in the right direction.

Accordingly, even if the other mobile robot moves away from the detection area, the present disclosure can control the other mobile robot 100*a* to be located back in the detection area 800 of the mobile robot 100*b* by rotating the mobile robot 100*b* in a direction that the other mobile robot 100*a* moves away from the detection area.

The control unit 1800 may continuously sense movement information (or position information) related to the other mobile robot 100*a* located in the detection area 800 so that the mobile robot 100*b* can travel with following the other mobile robot 100*a*.

As such, an operation of rotating the main body of the mobile robot 100*b* so that the other mobile robot 100*a* is located back in the detection area 800 of the mobile robot 100*b* when the other mobile robot 100*a* moves out of the detection area 800 may be referred to as a searching operation.

As illustrated in FIG. 11, when the other mobile robot 100*a* moves out of the detection area 800, the control unit 1800 may rotate the main body 100*b* such that the other mobile robot 100*a* is located back in the detection area 800.

Afterwards, when the other mobile robot 100*a* is located in the detection area 800 again by the rotation of the main body 100*b*, the control unit 1800 may determine (measure) a relative position (third relative position P3 (x3, y3) of the other mobile robot 100*a* through the sensing unit 1400.

The control unit 1800 may determine a plurality of relative positions P1, P2, and P3 of the other mobile robot 100*a* which is linearly traveling, and determine an angle θ' of a direction F1 that the other mobile robot 100*a* faces, based on the determined relative positions P1, P2, and P3.

Thereafter, the other mobile robot 100*a* may stop moving when it is moved by a predetermined distance. For example, when the other mobile robot 100*a* reaches the third relative position P3, which it has moved by the predetermined distance, the other mobile robot 100*a* may not move any more.

When the movement of the other mobile robot 100*a* by the predetermined distance is completed, the control unit 1800 may determine coordinates of the other mobile robot 100*a* as (x3, y3, θ') based on the relative position P3 to which the other mobile robot has completely moved and the determined angle θ' of the direction F1 that the other mobile robot 100*a* faces.

Accordingly, the present disclosure can provide an optimized following start scenario (or a method of determining arrangement of the first and second mobile robots for starting a following travel), in which the mobile robot (second mobile robot) 100*b* can accurately recognize the relative position of the other mobile robot (first mobile robot) 100*a* and the direction that the other mobile robot 100*a* faces, and can start the following travel in this state.

The control unit 1800 may transmit the determined coordinates of the other mobile robot 100*a* to the other mobile robot 100*a* through the communication unit 1100. In this case, the control unit of the other mobile robot 100*a* may determine the relative position of the mobile robot 100*b* using the received coordinates of the other mobile robot 100*a*.

In addition, the control unit 1800 may start the following travel with respect to the other mobile robot 100*a* based on the determined coordinates of the other mobile robot 100*a*.

Meanwhile, the present disclosure can locate the other mobile robot 100*a* so that following travel can be started after the mobile robot 100*b* and the other mobile robot 100*a* are arranged in an optimized state for the following travel.

Figure 12A:
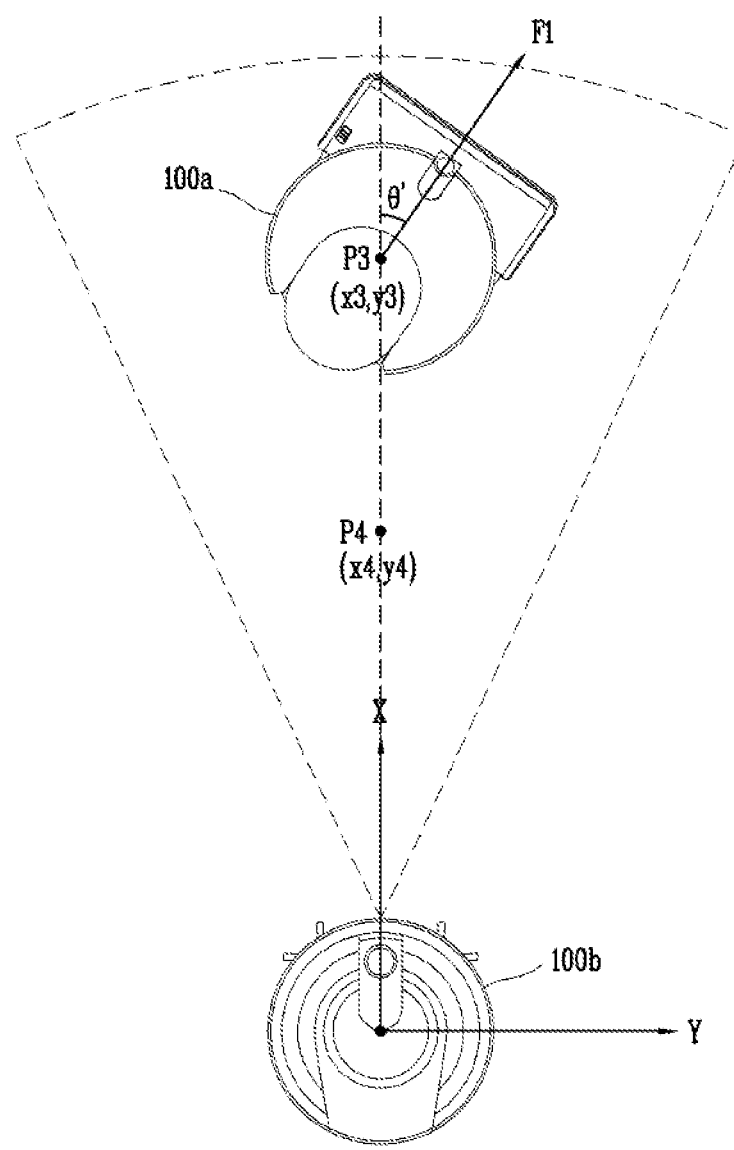
FIGS. 12A, 12B and 12C are conceptual views illustrating a method of arranging (aligning) a mobile robot and another mobile robot according to one embodiment of the present disclosure.
Figure 12B:
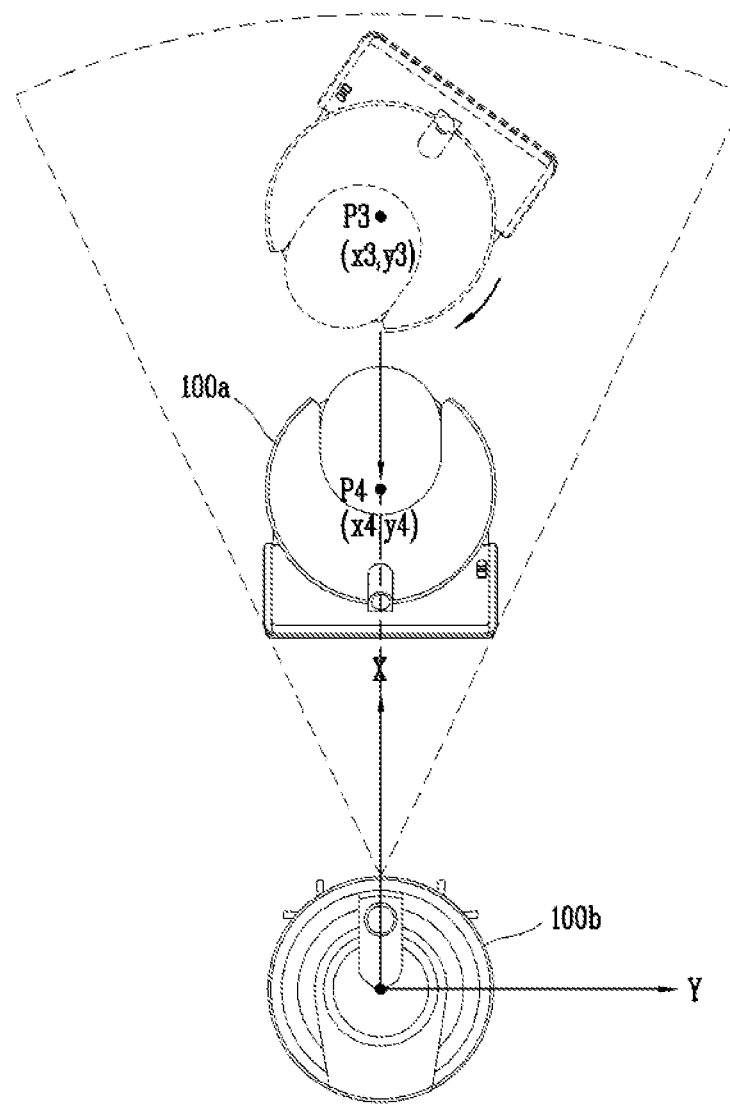
Figure 12C:
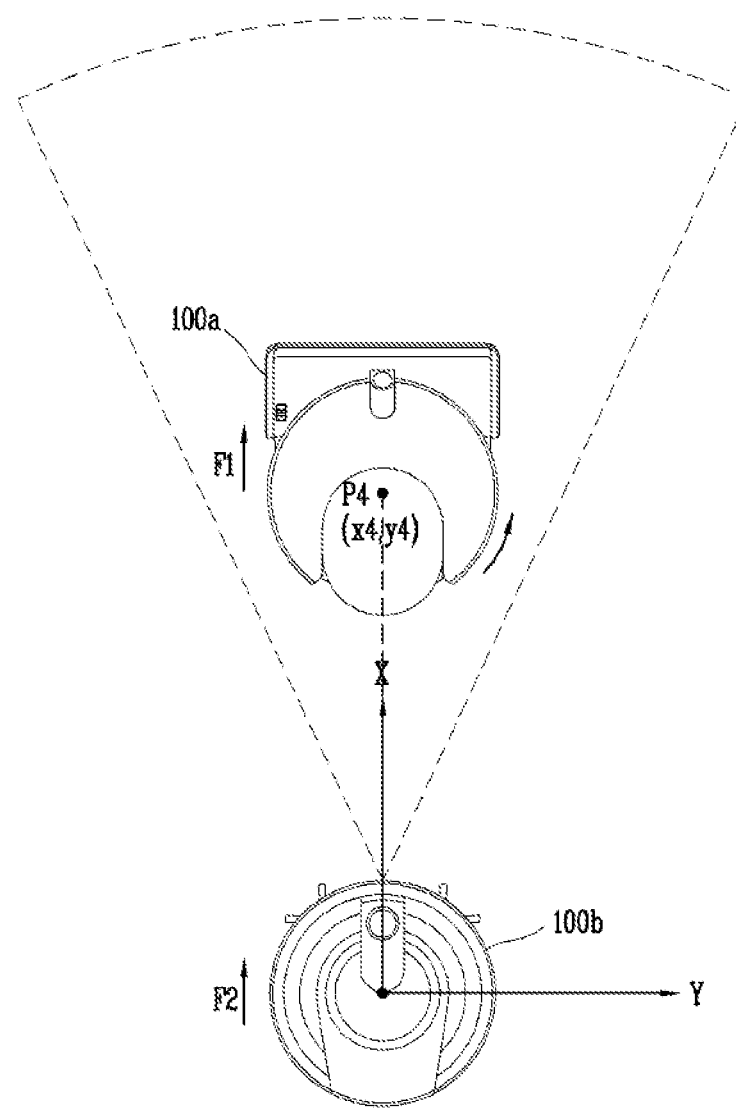

FIGS. 12A, 12B and 12C are conceptual views illustrating a method of arranging (aligning) a mobile robot and another mobile robot according to one embodiment of the present disclosure.

As illustrated in FIGS. 7 to 11, the control unit 1800 of the mobile robot 100*b* may continuously sense the relative position of the other mobile robot 100*a*, and control the other mobile robot 100*a* to linearly travel by a predetermined distance, thereby determining even a direction F1 that the other mobile robot 100*a* faces and an angle θ' of the direction F1.

The angle θ' of the direction F1 may refer to an angle between one axis (e.g., X axis) of the reference coordinate system of the mobile robot 100*b* and the direction F1.

As illustrated in FIG. 12A, the control unit 1800 of the mobile robot 100*b* may determine coordinates (x3, y3, θ') of the other mobile robot 100*a* that has linearly traveled by the predetermined distance.

The control unit 1800 may determine the relative position (x3, y3) of the other mobile robot and the direction F1 that the other mobile robot faces based on the fact that the other mobile robot is linearly traveling by the predetermined distance, and transmit to the other mobile robot a control signal for controlling the other mobile robot 100*a* to move to a specific point (arbitrary point) P4 (x4, y4) within the detection area 800, based on the relative position of the other mobile robot and the direction that the other mobile robot faces.

The control signal may include information related to an angle and a distance by which the other mobile robot 100*a* has to be rotated and moved to reach the specific point P4 from a currently-located place and in the currently-facing direction.

For example, the control unit 1800 may generate a control signal including an angle and a distance by which the other mobile robot 100a has to be rotated and moved to move to the specific point P4, based on the coordinates (x3, y3, θ') of the other mobile robot 100a and the coordinates (x4, y4) of the specific point P4, and transmit the generated control signal to the other mobile robot.

As illustrated in FIG. 12B, the other mobile robot 100a having received the control signal may move to the specific point P4 in the detection area 800 of the mobile robot 100b based on the control signal.

The specific point P4 may refer to a point optimized for the mobile robot 100b to follow the other mobile robot 100b, and may be a point which is located at the front of the mobile robot 100b, spaced apart from the mobile robot 100b by a predetermined distance, and included in the detection area 800.

The predetermined distance may be determined based on the result of a following travel simulation, and may be determined/changed by user setting.

The control unit 1800 of the mobile robot 100b may transmit to the other mobile robot a control signal for controlling the other mobile robot 100a to be rotated so as to face the same direction as the forward direction of the mobile robot 100b when it is sensed that the other mobile robot 100a is located at the specific point P4.

In this case, as illustrated in FIG. 12C, the direction (forward) F2 that the front surface of the mobile robot 100b faces and the direction (forward) F1 that the other mobile robot 100a faces may be the same as each other.

That is, the first mobile robot 100a and the second mobile robot 100b may face the same direction.

Since the first mobile robot 100a is located in front of the second mobile robot 100b and faces the same direction as the second mobile robot 100b, the first mobile robot 100a may smoothly start to follow the first mobile robot 100a as the second mobile robot 100b starts to move.

FIGS. 12A to 12C have illustrated that the other mobile robot 100a (first mobile robot) is moved so as to be located in the forward direction of the second mobile robot 100b, but the present disclosure is not limited to this.

The present disclosure can control the second mobile robot 100b as well as the other mobile robot (first mobile robot) 100a to be moved, in order to align the other mobile robot (first mobile robot) 100a at the front of the second mobile robot 100b.

Specifically, the control unit of the second mobile robot 100b may determine the relative position of the other mobile robot 100a and the direction that the other mobile robot 100a faces based on the fact that the other mobile robot (first mobile robot) 100a is linearly traveling by the predetermined distance, and then control the main body 100b to move to a point which is located at the rear of the other mobile robot 100a with a predetermined distance.

In other words, when the relative position of the other mobile robot 100a and the direction that the other mobile robot 100a faces are determined, the control unit of the second mobile robot 100b may control the main body of the second mobile robot 100b to be moved so that the second mobile robot 100b is located at a point which is spaced apart by a predetermined distance from the other mobile robot 100a at the rear of the other mobile robot 100a.

It should be understood that the second mobile robot 100b other than the first mobile robot 100a is moved for the arrangement (or alignment).

The control unit of the second mobile robot 100b may move the second mobile robot 100b to the point with the predetermined distance from the first mobile robot 100a at the rear of the first mobile robot 100a, based on the relative position of the other mobile robot 100a and the direction that the other mobile robot 100a faces.

The control unit of the second mobile robot 100b may rotate the main body to face the same direction as the direction that the other mobile robot 100a faces, after the main body has moved to the point with the predetermined distance from the other mobile robot 100a at the rear of the other mobile robot 100a.

In this case, the other mobile robot 100a (first mobile robot) may wait without movement and rotation at the relative position (x3, y3) described with reference to FIG. 12B.

Afterwards, when the second mobile robot 100b is rotated to face the same direction as the first mobile robot 100a after being moved to the point with the predetermined distance from the first mobile robot 100a, which is located at the relative position (x3, y3), in the rearward direction of the first mobile robot 100a (i.e., when the alignment is completed), the first mobile robot 100a and the second mobile robot 100b may start the following travel according to a preset algorithm.

As described above, the present disclosure can provide the method for controlling the mobile robots, in which the other mobile robot 100a can be arranged at an optimized position using the determined coordinates (x3, y3, θ') of the other mobile robot and aligned to face the same direction as the mobile robot 100b, and following travel can be started after the alignment, which may allow the following travel to be smoothly started.

The foregoing description will be applied to the method of controlling the mobile robot (second mobile robot) 100b in the same/similar manner.

For example, the method of controlling the mobile robots may include rotating a main body so that the other mobile robot is sensed in a detection area encompassing a predetermined projected angle with respect to the front of the main body, transmitting a control signal for causing the other mobile robot to travel linearly by a predetermined distance when the other mobile robot is present within the detection area due to the rotation of the main body, and determining a direction in which the other mobile robot travels linearly and deciding the determined direction as a direction that the other mobile robot faces.

The function/operation/control method of the mobile robot 100b described in this specification may alternatively be performed by the control unit of the other mobile robot (first mobile robot) 100a.

For example, when the mobile robot 100b travels ahead and the other mobile robot 100a follows the mobile robot 100b, the function/operation/control method of the control unit 1800 of the mobile robot 100b described in this specification may be performed by the control unit of the other mobile robot 100a in the same/similar manner.

Whether the first mobile robot 100a is to follow the second mobile robot 100b or the second mobile robot 100b is to follow the first mobile robot 100a may be determined at the time of manufacturing a product and may be determined/changed by user setting.

The present disclosure can provide a plurality of autonomous mobile robots capable of accurately determining a relative position of another mobile robot and a direction that the other mobile robot faces.

The present disclosure can provide mobile robots capable of smoothly performing following travel in a manner that another mobile robot follows a mobile robot without failure even if the other mobile robot moves out of a detection area of the mobile robot.

The present disclosure can provide a new following control method, capable of preventing a mobile robot from missing another mobile robot by rotating the mobile robot to detect the other mobile robot in a detection area of the mobile robot again when the other mobile robot moves out of the detection area, and allowing the mobile robot to follow the other mobile robot even if the other mobile robot moves out of the detection area of the mobile robot.

The present disclosure can provide mobile robots capable of determining even a direction that another mobile robot faces as well as a relative position of the other mobile robot when the mobile robot desires to start a following travel to travel with following the other mobile robot.

The present disclosure can provide mobile robots, capable of starting a following travel after determining an accurate state of another mobile robot which a mobile robot desires to follow, by way of determining a relative position of the other mobile robot and a direction that the other mobile robot faces.

The present disclosure can provide mobile robots, capable of performing an optimized following travel, by aligning a mobile robot and another mobile robot at positions and in states (facing direction) optimized for the mobile robot to follow the other mobile robot and then starting the following travel after the alignment.

The present disclosure described above can be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the control unit 1800. The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

What is claimed is:

1. A mobile robot, comprising:
a traveling unit configured to move or rotate a main body;
a communication unit configured to perform communication with another mobile robot;
a sensing unit configured to sense the other mobile robot existing in a detection area having a predetermined angle with respect to the front of the main body; and
a control unit configured to rotate the main body so that the other mobile robot is sensed within the detection area, and configured to control the communication unit to transmit a control signal to the other mobile robot, the control signal configured to cause the other mobile robot to travel in a linear direction for a predetermined distance, when the other mobile robot is present in the detection area,
wherein the control unit is configured to determine a relative position of the other mobile robot and a direction that the other mobile robot faces, based on the linear travel of the other mobile robot for the predetermined distance, and control the communication unit to transmit a control signal to the other mobile robot to cause the other mobile robot to move to a specific point within the detection area, based on the relative position of the other mobile robot and the direction that the other mobile robot faces.

2. The robot of claim 1, wherein the control unit is configured to determine, using the sensing unit, a direction in which the other mobile robot faces based on a direction in which the other mobile robot linearly travels.

3. The robot of claim 1, wherein the control unit is configured to:
determine a relative position of the other mobile robot using the sensing unit,
determine a plurality of relative positions of the other mobile robot while causing the other mobile robot to travel in a linear direction, and
determine a direction that the other mobile robot faces based on the plurality of relative positions of the other mobile robot.

4. The robot of claim 1, wherein the control unit is configured to determine coordinates of a position of the other mobile robot and an angle of a direction that the other mobile robot faces, based on a relative position of the other mobile robot and the direction that the other mobile robot faces as determined by the sensing unit.

5. The robot of claim 1, wherein the control unit is configured to rotate the main body based on a determination of a relative position of the other mobile robot using the sensing unit.

6. The robot of claim 1, wherein the control unit is configured to determine a relative position of the other mobile robot using the sensing unit, based on presence of the other mobile robot within the detection area resulting from the rotation of the main body.

7. The robot of claim 6, wherein the control unit is configured to transmit the control signal to the other mobile robot after determining the relative position of the other mobile robot.

8. The robot of claim 1, wherein the control unit is configured to:
transmit and receive an ultra-wideband signal to and from the other mobile robot using the sensing unit,
determine a distance to the other mobile robot using the ultra-wideband signal, and
determine a relative position of the other mobile robot, based on an angle by which the main body is rotated so that the other mobile robot is present within the detection area, and within the determined distance.

9. The robot of claim 1, wherein the control unit is configured to rotate the main body such that a front surface of the main body faces one point of the other mobile robot.

10. The robot of claim 1, wherein the control unit is configured to rotate the main body so that the other mobile robot is located back in the detection area when the other mobile robot is moved away from the detection area due to the linear travel of the other mobile robot.

11. The robot of claim 10, wherein the control unit is configured to determine, using the sensing unit, a direction that the other mobile robot is moved away from the detection area, and rotate the main body in a direction corresponding to the decided direction.

12. The robot of claim 1, wherein the control unit is configured to transmit to the other mobile robot a control signal for rotating the other mobile robot to face a direction that is the same as a direction faced by the front of the main body when the other mobile robot is sensed as being located at the specific point.

13. The robot of claim 1, wherein the control unit is configured to: determine a relative position of the other mobile robot and a direction that the other mobile robot faces, based on the linear travel of the other mobile robot for the predetermined distance, and move the main body to a point which is located at the rear of the other mobile robot with a predetermined spaced distance from the other mobile robot.

14. The robot of claim 13, wherein the control unit is configured to rotate the main body to face the same direction as the direction that the other mobile robot faces after the main body is moved to the point that is located at the rear of the other mobile robot with the predetermined spaced distance from the other mobile robot.

15. A method for controlling a mobile robot, the method comprising:
rotating a main body of the mobile robot such that another mobile robot is sensed within a detection area encompassing a predetermined projected angle with respect to the front of the main body;
transmitting to the other mobile robot a control signal configured for causing linear travel of the other mobile robot by a predetermined distance when the other mobile robot is located within the detection area resulting from the rotation of the main body;
determining a direction that the other mobile robot faces based on a direction that the other mobile robot travels in a linear direction;
determining a relative position of the other mobile robot and a direction that the other mobile robot faces, based on the linear travel of the other mobile robot for the predetermined distance; and
transmitting to the other mobile robot a control signal for moving the other mobile robot to a specific point within the detection area, based on the relative position of the other mobile robot and the direction that the other mobile robot faces.

* * * * *